US012134277B2

(12) United States Patent
Shmaiser et al.

(10) Patent No.: US 12,134,277 B2
(45) Date of Patent: Nov. 5, 2024

(54) PROTECTION OF COMPONENTS OF DIGITAL PRINTING SYSTEMS

(71) Applicant: LANDA CORPORATION LTD., Rehovot (IL)

(72) Inventors: Aharon Shmaiser, Rishon LeZion (IL); Ido Nativ, Tel Aviv (IL); Matan Bar-On, Hod Hasharon (IL); Zohar Goldenstein, Nes Ziona (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/203,058

(22) Filed: May 30, 2023

(65) Prior Publication Data

US 2023/0382142 A1 Nov. 30, 2023

Related U.S. Application Data

(63) Continuation of application No. 17/689,614, filed on Mar. 8, 2022, now Pat. No. 11,731,444, which is a (Continued)

(51) Int. Cl.
*B41J 29/387* (2006.01)
*B41J 2/005* (2006.01)
(Continued)

(52) U.S. Cl.
CPC ........... *B41J 29/387* (2013.01); *B41J 2/0057* (2013.01); *B41J 2/0451* (2013.01); *B41J 2/04586* (2013.01); *B41J 2002/012* (2013.01)

(58) Field of Classification Search
CPC ......... B65H 7/02; B41J 11/0095; B41J 11/20; B41J 25/3082; B41J 25/3086; B41J 2/0057; B41J 2/0451
See application file for complete search history.

(56) References Cited

U.S. PATENT DOCUMENTS 3,076,492 A 2/1963 Monks
3,764,188 A 10/1973 Suska et al.
(Continued)

FOREIGN PATENT DOCUMENTS

CN 1990366 A 7/2007
CN 101058375 A 10/2007
(Continued)

OTHER PUBLICATIONS

CN101058375A Machine Translation (by EPO and Google)—published Oct. 24, 2007; Ricoh KK [JP].
(Continued)

*Primary Examiner* — John Zimmermann
(74) *Attorney, Agent, or Firm* — Momentum IP; Marc Van Dyke

(57) ABSTRACT

A printing system comprises an intermediate transfer member, an image-forming station comprising a print bar disposed over a surface of the ITM, a conveyer for driving rotation of the ITM, a detection system configured to detect foreign matter transported at a detection location upstream of the image-forming station, and a response system operatively coupled to the detection system to respond to the detection of foreign matter by performing at least one collision-prevention action to prevent a potential collision between foreign matter and the print bar.

25 Claims, 16 Drawing Sheets

Related U.S. Application Data continuation of application No. 16/764,339, filed as application No. PCT/IB2018/059277 on Nov. 25, 2018, now Pat. No. 11,298,963.

(60) Provisional application No. 62/591,847, filed on Nov. 29, 2017.

(51) Int. Cl.
*B41J 2/045* (2006.01)
*B41J 2/01* (2006.01)

(56) References Cited

U.S. PATENT DOCUMENTS

| | | | | |
|---|---|---|---|---|
| 3,791,644 | A | 2/1974 | DeMoore | |
| 4,190,245 | A | 2/1980 | Brandes | |
| 4,225,872 | A | 9/1980 | Marinoff | |
| 4,786,045 | A | 11/1988 | Sam | |
| 5,096,291 | A | 3/1992 | Scott | |
| 5,127,329 | A | 7/1992 | DeMoore et al. | |
| 7,562,974 | B2 | 7/2009 | Nishitani et al. | |
| 11,731,444 | B2 | 8/2023 | Shmaiser et al. | |
| 2005/0270351 | A1* | 12/2005 | Mouri | B41J 2/2114 347/103 |
| 2006/0192804 | A1 | 8/2006 | Nakata et al. | |
| 2008/0112743 | A1 | 5/2008 | Moore | |
| 2011/0226061 | A1* | 9/2011 | Itsumi | B65H 7/02 73/589 |
| 2011/0316924 | A1 | 12/2011 | Kobayashi et al. | |
| 2012/0251211 | A1 | 10/2012 | Hasegawa et al. | |
| 2013/0081853 | A1 | 4/2013 | Mundra et al. | |
| 2014/0078207 | A1 | 3/2014 | Ishida et al. | |
| 2017/0003266 | A1 | 1/2017 | Goto et al. | |
| 2018/0229516 | A1 | 8/2018 | Cloots | |
| 2018/0229518 | A1 | 8/2018 | Masuda et al. | |
| 2022/0153016 | A1 | 5/2022 | Landa et al. | |
| 2022/0379598 | A1 | 12/2022 | Landa et al. | |

FOREIGN PATENT DOCUMENTS

| | | | |
|---|---|---|---|
| CN | 103029435 | A | 4/2013 |
| DE | 7410852 | U | 8/1975 |
| DE | 19733692 | A1 | 2/1999 |
| EP | 2407311 | B1 | 8/2013 |
| GB | 2336837 | A | 11/1999 |
| JP | 2005313519 | A | 11/2005 |
| JP | 2007001185 | A | 1/2007 |
| JP | 2007217096 | A | 8/2007 |
| JP | 2010076910 | A | 4/2010 |
| JP | 2015174750 | A | 10/2015 |
| WO | 2005037691 | A1 | 4/2005 |

OTHER PUBLICATIONS

CN103029435A Machine Translation (by EPO and Google)—published Apr. 10, 2013; Xerox Corp.

CN1990366A Machine Translation (by EPO and Google)—published Jul. 4, 2007; Brother Ind Ltd.

DE19733692A1 Machine Translation (by EPO and Google)—published Feb. 11, 1999; Heidelberger Druckmasch AG [DE].

DE7410852U Machine Translation (by EPO and Google)—published Aug. 21, 1975; Heidelberger Druckmaschinen AG [DE].

JP2007217096A Machine Translation (by EPO and Google)—published Aug. 30, 2007; Fuji Xerox Co Ltd.

WO2005037691A1 Machine Translation (by EPO and Google Patents)—published Apr. 28, 2005; Iguchi Kiko Co Ltd [JP] et al.

Co-pending U.S. Appl. No. 18/482,917, filed Oct. 9, 2023.

JP2005313519A Machine Translation (by EPO and Google)—published Nov. 10, 2005; Toppan Printing Co Ltd.

JP2007001185A Machine Translation (by EPO and Google)—published Jan. 11, 2007; Olympus Corp.

JP2010076910A Machine Translation (by EPO and Google)—published Apr. 8, 2010; Brother Ind Ltd.

JP2015174750A Machine Translation (by EPO and Google)—published Oct. 5, 2015; Seiko Epson Corp.

* cited by examiner

ELEVATION VIEW *V1* –
ITM HORIZONTAL
IF INSTALLED AT *L3* or *L4*

ELEVATION VIEW *V1* –
ITM VERTICAL
IF INSTALLED AT *L1* or *L2*

COLLISION INTENSITY BELOW $INT_{MIN}$

PROTECTION OF COMPONENTS OF DIGITAL PRINTING SYSTEMS

CROSS-REFERENCE TO RELATED APPLICATIONS

PCT/IB2018/059277 claims the benefit of U.S. Provisional Patent Application No. 62/591,847 filed on Nov. 29, 2017, which is incorporated herein by reference in its entirety. PCT/IB2018/059277 filed on Nov. 25, 2018 is incorporated herein by reference in its entirety

FIELD OF THE INVENTION

The present invention relates to systems and methods for protecting elements of a digital printing system from potential damage from foreign matter conveyed by moving parts of the printing system. In particular, the present invention is suitable for protecting elements of indirect printing systems using an intermediate transfer member.

BACKGROUND

Various printing devices have previously been proposed that use an indirect inkjet printing process, this being a process in which an inkjet print head is used to print an image onto the surface of an intermediate transfer member, which is then used to transfer the image onto a substrate. The intermediate transfer member (ITM) may be a rigid drum or a flexible belt (e.g. guided over rollers or mounted onto a rigid drum), also herein termed a blanket. Foreign matter may be inadvertently transported at high speeds by the ITM towards the inkjet print heads, which can cause damage to the print heads if not averted.

SUMMARY

The present disclosure relates to printing systems and methods of operating printing systems, for example, a digital printing system having a moving intermediate transfer member (ITM) such as, for example, a flexible ITM (e.g. a blanket) mounted over a plurality of rollers (e.g. a belt) or mounted over a rigid drum (e.g. a drum-mounted blanket).

An ink image is formed on a surface of the moving ITM (e.g. by droplet deposition at an image-forming station) and subsequently transferred to a substrate, which can comprise a paper, a plastic, a metal, or any other suitable material. To transfer the ink image to the substrate, substrate is pressed between at least one impression cylinder and a region of the moving ITM where the ink image is located, at which time the transfer station (also called an impression station) is said to be engaged.

For flexible ITMs mounted over a plurality of rollers, an impression station typically comprises in addition to the impression cylinder, a pressure cylinder or roller the outer surface of which may optionally be compressible. The flexible blanket or belt passes in between such two cylinders which can be selectively engaged or disengaged, typically when the distance between the two is reduced or increased. One of the two cylinders may be at a fixed location in space, the other one moving toward or apart of it (e.g. the pressure cylinder is movable or the impression cylinder is movable) or the two cylinders may each move toward or apart from the other. For rigid ITMs, the drum (upon which a blanket may optionally be mounted) constitutes the second cylinder engaging or disengaging from the impression cylinder.

For the sake of clarity, the word rotation is used herein to denote the movement of an ITM in a printing press in a print direction, regardless of whether the movement is at various places in the printing press locally linear or locally rotational or otherwise. For rigid ITMs having a drum shape or support, the motion of the ITM is rotational. The print direction is defined by the movement of an ink image from an image forming station to an impression station. Unless the context clearly indicates otherwise, the terms upstream and downstream as may be used hereinafter relate to positions relative to the printing direction.

Some embodiments relate to printing systems, and in particular printing systems that can comprise an intermediate transfer member (ITM) comprising a flexible endless belt mounted over a plurality of guide rollers, an image-forming station comprising a print bar disposed over a surface of the ITM, the print bar configured to form ink images upon a surface of the ITM by droplet deposition, a conveyer for driving rotation of the ITM at a fixed rotation speed in a print direction to transport the ink images towards an impression station where they are transferred to substrate, a detection system configured to detect foreign matter transported at a detection location upstream of the image-forming station and downstream of the impression station by the rotating ITM, and a response system operatively coupled to the detection system to respond to the detection of foreign matter by performing at least one collision-prevention action to prevent a potential collision between foreign matter and the print bar.

In embodiments, a printing system can comprise an intermediate transfer member (ITM) comprising a flexible endless belt mounted over a plurality of guide rollers, an image-forming station comprising a print bar disposed over a surface of the ITM, the print bar configured to form ink images upon a surface of the ITM by droplet deposition, a conveyer for driving rotation of the ITM at a fixed rotation speed in a print direction to transport the ink images towards an impression station where they are transferred to substrate, a detection system configured to detect foreign matter transported at a detection location upstream of the image-forming station and downstream of the impression station by the rotating ITM, collision prediction circuitry for predicting a potential collision between foreign matter and the print bar and/or a likelihood of the potential collision, and a response system operatively coupled to the prediction circuitry to respond to the predicting of a potential collision\by performing at least one collision-prevention action to prevent a potential collision between foreign matter and the print bar.

In some embodiments, a printing system can comprise an intermediate transfer member (ITM) comprising a flexible endless belt mounted over a plurality of guide rollers, an image-forming station comprising a print bar disposed over a surface of the ITM, the print bar configured to form ink images upon a surface of the ITM by droplet deposition, a conveyer for driving rotation of the ITM at a fixed rotation speed in a print direction to transport the ink images towards an impression station where they are transferred to substrate, a mechanical detection system for detecting matter transported at a detection location upstream of the image-forming station and downstream of the impression station by the rotating ITM, the mechanical detection system comprising an elongated blade disposed lengthwise across the width of the ITM, a linking element comprising one of an extension spring and a pneumatic resistance piston, the linking element linking the blade to a rigid frame, and at least one of a limit switch and a camera, wherein a gap G2 between the ITM and an edge of the blade proximate to the ITM is smaller than a gap G1 between the print bar and the ITM, and wherein at the detection location, the ITM is stretched over an upstream guide roller, and a response system operatively coupled to the detection system to respond to the detection of foreign matter by performing at least one collision-prevention action to prevent a potential collision between foreign matter and the print bar.

In embodiments, a printing system can comprise an intermediate transfer member (ITM) comprising a flexible endless belt mounted over a plurality of guide rollers, an image-forming station comprising a print bar disposed over a surface of the ITM with a minimum gap of G1 therebetween, the print bar configured to form ink images upon a surface of the ITM by droplet deposition, a conveyer for driving rotation of the ITM at a fixed rotation speed in a print direction to transport the ink images towards an impression station where they are transferred to substrate, a detection system configured to detect foreign matter transported at a detection location upstream of the image-forming station and downstream of the impression station by the rotating ITM, and a response system operatively coupled to the detection system to respond to the detection of foreign matter by performing, within a response time, a collision-prevention action to prevent a potential collision between foreign matter and the print bar, wherein the collision-prevention action can comprise lifting the print bar to a height that is at least twice the gap G1, the response system can comprise an electric actuator, and the response time can be defined by the speed of the rotating ITM and the distance from the detection location to the image-forming station along the travel path of the ITM in the print direction. In some embodiments, the collision-prevention action can comprise lifting the print bar to a height that is at least five times the gap G1. In some embodiments, the collision-prevention action can comprise lifting the print bar to a height that is at least ten times the gap G1.

In embodiments, a printing system can comprise an intermediate transfer member (ITM) comprising a flexible endless belt mounted over a plurality of guide rollers, an image-forming station comprising a print bar disposed over a surface of the ITM, the print bar configured to form ink images upon a surface of the ITM by droplet deposition, a conveyer for driving rotation of the ITM at a fixed rotation speed in a print direction to transport the ink images towards an impression station where they are transferred to substrate, a mechanical detection system for detecting matter transported at a detection location upstream of the image-forming station and downstream of the impression station by the rotating ITM, the mechanical detection system comprising an elongated blade disposed lengthwise across the width of the ITM, a linking element comprising one of an extension spring and a pneumatic resistance piston, the linking element linking the blade to a rigid frame and at least one of a limit switch and a camera, wherein a gap G2 between the ITM and an edge of the blade proximate to the ITM is smaller than a gap G1 between the print bar and the ITM, and wherein at the detection location, the ITM is stretched over an upstream guide roller, and a response system operatively coupled to the detection system to respond to the detection of foreign matter by performing, within a response time, a collision-prevention action to prevent a potential collision between foreign matter and the print bar, wherein the collision-prevention action can comprise lifting the print bar to a height that is at least twice the gap G1, the response system can comprise an electric actuator, and the response time can be defined by the speed of the rotating ITM and the distance from the detection location to the image-forming station along the travel path of the ITM in the print direction. In some embodiments, the collision-prevention action can comprise lifting the print bar to a height that is at least five times the gap G1. In some embodiments, the collision-prevention action can comprise lifting the print bar to a height that is at least ten times the gap G1.

In some embodiments, the detection system can comprise one of a laser transmitter, an image processing system, an acoustic detection system, and a mechanical detection system. In some embodiments, the detection system can comprise a detection element disposed adjacent to the ITM at said detection location and oriented in the cross-print direction. The detection element can comprise one of a laser beam, a music string and an elongated blade.

In some embodiments, a gap G2 between the detection element and the ITM can be smaller than a gap G1 between the print bar and the ITM. It can be that Gap G2 is no more than 90% as large as gap G1. In some embodiments it can be that Gap G2 is no more than 70% as large as gap G1. In some embodiments it can be that Gap G2 is no more than 70% as large as gap G1.

In embodiments, the ITM is stretched over an upstream guide roller at the detection location. The printing system can define x, y and z axes, wherein the x and z axes are parallel to a floor and are orthogonal to each other, and together define a plane, the y axis is orthogonal to the plane, a vector in the print direction and tangent to the ITM at the detection location has only a y-axis dimension, the detection element has at least a z-axis dimension, and gap G2 has only an x-axis dimension. The distance from the detection location to the image-forming station along the travel path of the ITM in the print direction can be less than 10% of the total length of the ITM. The distance can be less than 5% of the total length of the ITM. The distance can be less than 2% of the total length of the ITM. In embodiments, the fixed rotation speed can be between one-tenth and one-half of a rotation per second. In some embodiments, the fixed rotation speed can be between one-eighth and one-quarter of a rotation per second.

The detection system, according to embodiments, can comprise a mechanical detection system configured to detect an impact between the detection element and foreign matter. In embodiments, the detection and response systems can be configured so that the performing of the at least one collision-prevention action is contingent upon an intensity of the impact between the foreign matter and the detection element exceeding a pre-determined threshold. The detection and response systems can be configured so that the performing of the at least one collision-prevention action is contingent upon a calculated projection of the intensity of a future collision between the foreign matter and the print head exceeding a pre-determined threshold.

In embodiments, the at least one collision-prevention action includes lifting the print bar. Lifting the print bar can be to a height that is at least twice or at least five times or at least ten times gap G1. In some embodiments, lifting the print bar can be to a height that is at least five times the gap G1. In some embodiments, lifting the print bar can be to a height that is at least ten times the gap G1.

The foreign matter, according to embodiments, can comprise at least one of: transparent treatment film applied to the surface of the ITM downstream of the impression station and upstream of the detection location, a silicon-containing material contained in a surface release layer of the ITM, dried ink, substrate material, a cleaning solution and a cooling solution.

In some embodiments, the at least one collision-prevention action can include moving a surrogate object into a location upstream of the print bar so that the foreign matter collides with the surrogate object instead of with the print bar. In some embodiments, a response-time for preventing the potential collision between foreign matter and the print bar can be defined by the speed of the rotating ITM and the distance from the detection location to the image-forming station along the travel path of the ITM in the print direction, and the detection and response systems can be configured so that the at least one collision-prevention action is performed within the response time. The response time can be less than one second. The response time can be less than 500 milliseconds. The response time can be less than 200 milliseconds. In some embodiments, the at least one collision-prevention action can additionally include stopping the rotation of the ITM.

According to embodiments of the invention, a mechanical detection system for detecting foreign matter transported by a rotating intermediate transfer member (ITM) in a printing system (a printing system that comprises an image-forming station where ink images are formed on the ITM and an impression station where ink images are transferred to substrate), can comprise an elongated blade, a linkage means containing a spring, the linkage means linking the blade to a rigid frame, and at least one of a limit switch and a camera.

In some embodiments, a mechanical detection system for detecting foreign matter transported by a rotating intermediate transfer member (ITM) in a printing system (a printing system that comprises an image-forming station where ink images are formed on the ITM and an impression station where ink images are transferred to substrate), can comprise an elongated blade, a spring connecting the blade to a rigid frame, and at least one of a limit switch and a camera.

In some embodiments, a mechanical detection system for detecting foreign matter transported by a rotating intermediate transfer member (ITM) in a printing system (a printing system that comprises an image-forming station where ink images are formed on the ITM and an impression station where ink images are transferred to substrate), can comprise an elongated blade, an elastic mediating element connecting the blade to a rigid frame, and at least one of a limit switch and a camera.

In embodiments, the mechanical detection system can be disposed at a detection location facing the ITM downstream of the impression station and upstream of the image-forming station. An edge of the elongated blade proximate to the ITM can be displaced therefrom with a gap, so that a particle of foreign matter larger than the gap in the direction normal to the surface of the ITM at the detection location will impact the edge of the elongated blade. The mechanical detection system can be configured to detect an impact between foreign matter and the elongated blade. The detecting can comprise at least one of contacting a limit switch and determining an angle of the blade from an image. The mechanical detection system cab be additionally configured to send a signal to a response system to initiate a collision-prevention response to prevent a collision between the foreign matter and a component of the image-forming station. Sending the signal to the response system can be contingent upon an intensity of the impact between the foreign matter and the elongated blade exceeding a pre-determined threshold. In some embodiments, the mechanical detection system can additionally comprise a pivot.

Some embodiments relate to printing systems, and in particular a method of operating a printing system wherein a print bar forms ink images upon a rotating intermediate transfer member (ITM) and the ink images are subsequently transported by the ITM to an impression station where they are transferred to substrate, where the method can comprise detecting foreign matter transported by the rotating ITM at a detection location upstream of the image-forming station and downstream of the impression station, and responding to the detection by performing at least one collision-prevention action to prevent a potential collision between foreign matter and the print bar. The detecting can be accomplished by using a detection system comprising one of a laser transmitter, an image processing system, an acoustic detection system, and a mechanical detection system. The detecting can be accomplished by using a detection system comprising a detection element disposed adjacent to the ITM at said detection location and oriented in the cross-print direction. The detection element can comprise one of a laser beam, a music string and an elongated blade.

In embodiments of the method, a gap G2 between the detection element and the ITM can be smaller than a gap G1 between the print bar and the ITM. It can be that Gap G2 is no more than 90% as large as gap G1. In some embodiments it can be that Gap G2 is no more than 70% as large as gap G1. In some embodiments it can be that Gap G2 is no more than 70% as large as gap G1. In embodiments of the method, the ITM can be stretched over an upstream guide roller at the detection location.

According to some embodiments of the method, the printing system defines x, y and z axes, the x and z axes are parallel to a floor and are orthogonal to each other, and together define a plane, the y axis is orthogonal to the plane, a vector in the print direction and tangent to the ITM at the detection location has only a y-axis dimension, the detection element has at least a z-axis dimension, and gap G2 has only an x-axis dimension.

In embodiments of the method, the distance from the detection location to the image-forming station along the travel path of the ITM in the print direction can be less than 10% of the total length of the ITM. The distance can be less than 5% of the total length of the ITM. The distance can be less than 2% of the total length of the ITM. The fixed rotation speed can be between one-tenth and one-half of a rotation per second. In some embodiments, the fixed rotation speed can be between one-eighth and one-quarter of a rotation per second.

In some embodiments, the detecting can be accomplished using a mechanical detection system configured to detect an impact between the detection element and foreign matter. In some embodiments, the responding to the detection can be contingent upon an intensity of the impact between the foreign matter and the detection element exceeding a pre-determined threshold. In some embodiments, the responding to the detection can be contingent upon a calculated projection of the intensity of a future collision between the foreign matter and the print head exceeding a pre-determined threshold.

In embodiments of the method, the at least one collision-prevention action can include lifting the print bar. Lifting the print bar can be to a height that is at least twice the gap G1. In some embodiments, lifting the print bar can be to a height that is at least five times the gap G1. In some embodiments, lifting the print bar can be to a height that is at least ten times the gap G1.

In some embodiments of the method, the foreign matter can comprise at least one of: transparent treatment film applied to the surface of the ITM downstream of the impression station and upstream of the detection location, a silicon-containing material contained in a surface release layer of the ITM, dried ink, substrate material, a cleaning solution and a cooling solution. In some embodiments of the method, the at least one collision-prevention action includes moving a surrogate object into a location upstream of the print bar so that the foreign matter collides with the surrogate object instead of with the print bar.

In embodiments of the method, a response-time for preventing the potential collision between foreign matter and the print bar can be defined by the speed of the rotating ITM and the distance from the detection location to the image-forming station along the travel path of the ITM in the print direction, and the responding can be accomplished such that the at least one collision-prevention action is performed within the response time. The response time can be less than one second. The response time can be less than 500 milliseconds. The response time can be less than 200 milliseconds.

In some embodiments of the method, the at least one collision-prevention action can additionally include stopping the rotation of the ITM.

In embodiments, a printing system comprises an intermediate transfer member (ITM) comprising a flexible endless belt mounted over a plurality of guide rollers, an image-forming station comprising a print bar disposed over a surface of the ITM, the print bar configured to form ink images upon a surface of the ITM by droplet deposition, a conveyer for driving rotation of the ITM at a fixed rotation speed in a print direction to transport the ink images towards an impression station where they are transferred to substrate, a mechanical detection system for detecting foreign matter transported at a detection location upstream of the image-forming station and downstream of the impression station by the rotating ITM—the mechanical detection system comprising an elongated blade disposed lengthwise across the width of the ITM, a linking element comprising one of an extension spring and a pneumatic resistance piston, the linking element linking the blade to a rigid frame, and at least one of a limit switch for detecting an orientation of the elongated blade and a imaging system comprising a camera for imaging the elongated blade and image-circuitry for detecting an orientation of the elongated blade by analyzing output of the camera (wherein a gap G2 between the ITM and an edge of the blade proximate to the ITM is smaller than a gap G1 between the print bar and the ITM, and at the detection location, the ITM is stretched over an upstream guide roller) —and a response system operatively coupled to the detection system to respond to the detection of transported foreign matter by performing at least one collision-prevention action to prevent a potential collision between foreign matter and the print bar.

In embodiments, a printing system comprises an intermediate transfer member (ITM) comprising a flexible endless belt mounted over a plurality of guide rollers, an image-forming station comprising a print bar disposed over a surface of the ITM, the print bar configured to form ink images upon a surface of the ITM by droplet deposition, a conveyer for driving rotation of the ITM at a fixed rotation speed in a print direction to transport the ink images towards an impression station where they are transferred to substrate, a mechanical detection system for detecting foreign matter transported at a detection location upstream of the image-forming station and downstream of the impression station by the rotating ITM—the mechanical detection system comprising an elongated blade disposed lengthwise across the width of the ITM, an expandable linking element, the expandable element being elastic and/or having pneumatically or hydraulic based resistance, comprising one of an extension spring and a pneumatic resistance piston, the expandable linking element linking the blade to a rigid frame, and at least one blade orientation-detector for detecting an orientation of the elongated blade or a rotation thereof at least one of a limit switch and a camera (wherein a gap G2 between the ITM and an edge of the blade proximate to the ITM is smaller than a gap G1 between the print bar and the ITM, and at the detection location, the ITM is stretched over an upstream guide roller) —and a response system operatively coupled to the detection system to respond to the detection of the transported foreign matter by performing at least one collision-prevention action to prevent a potential collision between foreign matter and the print bar.

In some embodiments, the expandable linking element comprises a spring. In some embodiments, the expandable linking element comprises pneumatic or hydraulic piston. In some embodiments, the blade orientation-detector comprises a limit switch for detecting an orientation of the blade. In some embodiments, the blade orientation-detector comprises an imaging system comprising a camera for imaging the elongated blade and image-circuitry for detecting an orientation of the elongated blade by analyzing output of the camera. In some embodiments, the blade-orientation-detector is magnetic (in non-limiting examples, using a reed switch or a proximity switch). In some embodiments, the blade-orientation comprises an encoder.

In embodiments, a printing system comprises an intermediate transfer member (ITM) comprising a flexible endless belt mounted over a plurality of guide rollers, an image-forming station comprising a print bar disposed over a surface of the ITM with a minimum gap of G1 therebetween, the print bar configured to form ink images upon a surface of the ITM by droplet deposition, a conveyer for driving rotation of the ITM at a fixed rotation speed in a print direction to transport the ink images towards an impression station where they are transferred to substrate, a detection system configured to detect foreign matter transported at a detection location upstream of the image-forming station and downstream of the impression station by the rotating ITM, and a print-bar-lifting system operatively coupled to the detection system to respond to the detection of the detected transported foreign matter by lifting the print-bar so as to prevent a potential collision between the detected transported foreign matter and the print bar.

In some embodiments, the response system comprises an electric actuator. In some embodiments, the lifting of the print bar is performed within a response time defined by the speed of the rotating ITM and the distance from the detection location to the image-forming station along the travel path of the ITM in the print direction. In some embodiments, the lifting of the print bar is to a height that is at least twice the gap G1. In some embodiments, lifting the print bar can be to a height that is at least five times the gap G1. In some embodiments, lifting the print bar can be to a height that is at least ten times the gap G1.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

Figure 1:
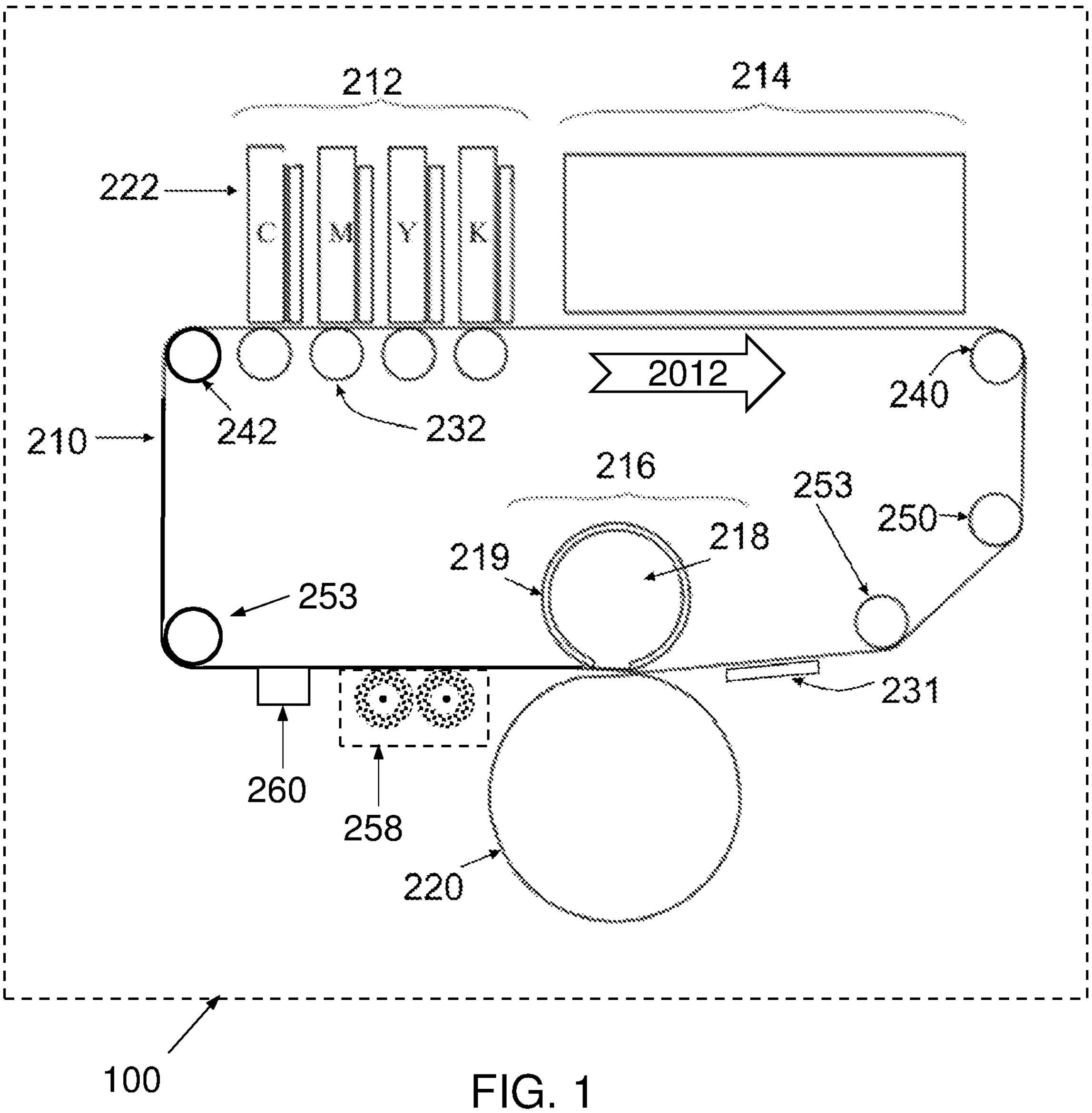
FIG. 1 is an elevation-view illustration of a printing system according to embodiments.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

For the present disclosure "electronic circuitry" is intended broadly to describe any combination of hardware, software and/or firmware. Electronic circuitry may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

In various embodiments, an ink image is first deposited on a surface of an intermediate transfer member (ITM), and transferred from the surface of the intermediate transfer member to a substrate (i.e. sheet substrate or web substrate). For the present disclosure, the terms "intermediate transfer member", "image transfer member" and "ITM" are synonymous, and may be used interchangeably. The location at which the ink is deposited on the ITM is referred to as the "image forming station". In many embodiments, the ITM comprises a "belt" or "endless belt" or "blanket" and these terms are used interchangeably with ITM.

The area or region of the printing press at which the ink image is transferred to substrate is an "impression station". It is appreciated that for some printing systems, there may be a plurality of impression stations. In some embodiments of the invention, the intermediate transfer member is formed as a belt comprising a reinforcement or support layer coated with a release layer. In a non-limiting example, the reinforcement layer may be of a fabric that is fiber-reinforced so as to be substantially inextensible lengthwise. By "substantially inextensible", it is meant that during any cycle of the belt, the distance between any two fixed points on the belt will not vary to an extent that will affect the image quality. The length of the belt may however vary with temperature or, over longer periods of time, with ageing or fatigue. In its width ways direction, the belt may have a small degree of elasticity to assist it in remaining taut and flat as it is pulled through the image forming station. A suitable fabric may, for example, have glass fibers in its longitudinal direction woven, stitched or otherwise held with cotton fibers in the perpendicular direction.

For an endless intermediate transfer member, the "length" of an ITM is defined as the circumference thereof.

Referring now to the figures, FIG. 1 is a schematic diagram of a printing system 100 for indirect printing according to some embodiments of the present invention. The system of FIG. 1 comprises an intermediate transfer member (ITM) 210 comprising a flexible endless belt mounted over a plurality of guide rollers 232, 240, 250, 253, 242. In other examples (NOT SHOWN), the ITM 220 is a drum or a belt wrapped around a drum. This figure shows aspects of a specific configuration relevant to discussion of the invention, and the shown configuration is not limited to the presented number and disposition of the rollers, nor is it limited to the shape and relative dimensions, all of which are shown here for convenience of illustrating the system components in a clear manner.

Figure 3:
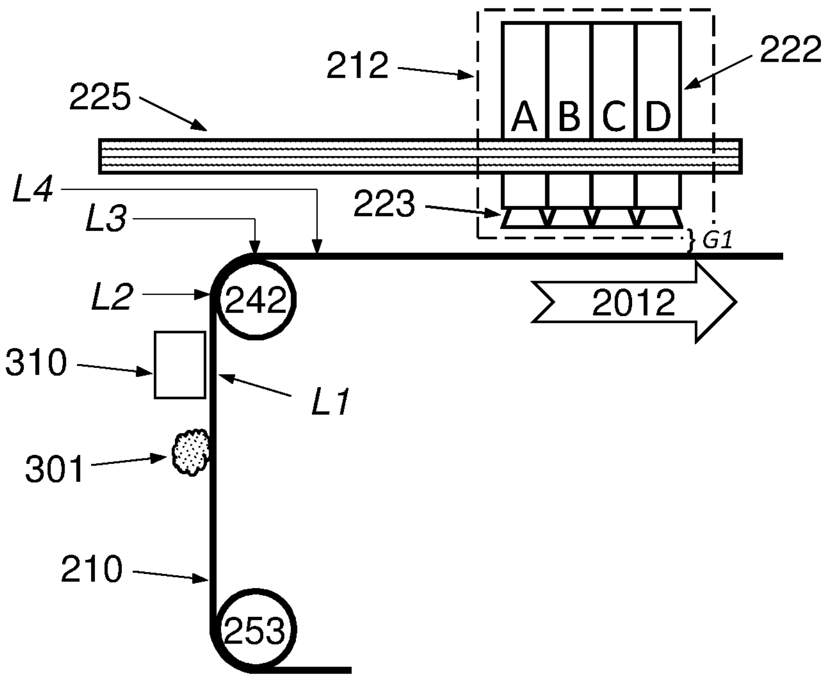

In the example of FIG. 1, the ITM 210 rotates in the clockwise direction relative to the drawing. The direction of belt movement defines upstream and downstream directions. Rollers 242, 240 are respectively positioned upstream and downstream of the image forming station 212—thus, roller 242 may be referred to as a "upstream roller" while roller 240 may be referred to as a "downstream roller". The printing system 100 further comprises:

(a) an image forming station 212 comprising print bars 222A-222D (each designated one of C, M Y and K), where each print bar comprises ink jet printing head(s) 223 as shown in FIG. 3. The image forming station 212 is configured to form ink images (NOT SHOWN) upon a surface of the ITM 210 (e.g., by droplet deposition thereon);

(b) a drying station 214 for drying the ink images;

(c) an impression station 216 where the ink images are transferred from the surface of the ITM 210 to sheet 231 or web substrate (only sheet substrate is illustrated in FIG. 1).

In the particular non-limiting example of FIG. 1, the impression station 216 comprises an impression cylinder 220 and a blanket/pressure cylinder 218 that carries a compressible blanket 219.

(d) a cleaning station 258 upstream from the impression station (which can comprise cleaning brushes, as shown in FIG. 1, which is only one example of a cleaning solution that can be employed in the system) where residual material (e.g. treatment film and/or ink images or portions thereof or other residual material) is cleaned from the surface of the ITM 210.

(e) a treatment station 260 upstream from the impression station and the cleaning station (where a layer of liquid treatment formulation (e.g. aqueous treatment solution) is applied on the ITM surface. As an example, the treatment solution can comprise a dilute solution of a charged polymer.

The skilled artisan will appreciate that not every component illustrated in FIG. 1 is required. Also, the cooling and the cleaning stations can be combined to a single station, which can also fulfill a cooling function, for cooling the ITM before it continues to the image forming station 212.

Figure 2:
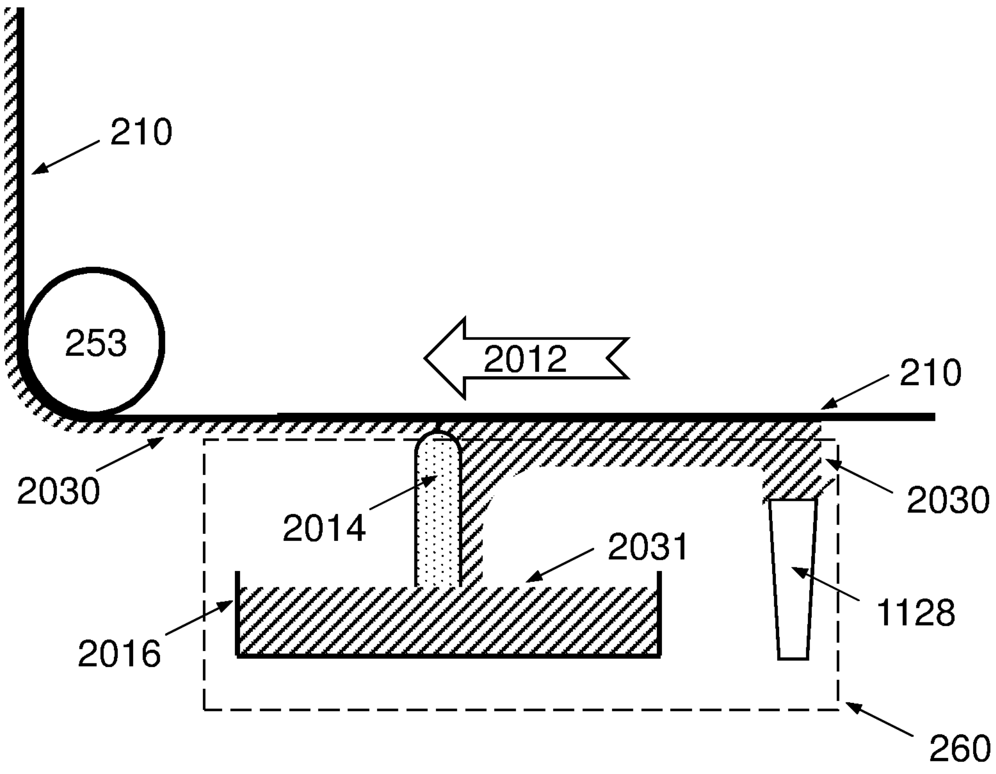
FIGS. 2 and 3 are elevation-view illustrations of components of a printing system according to embodiments.

One example of a treatment station 260 is schematically shown in FIG. 2.

In the particular non-limiting embodiment of FIG. 2, the ITM 210 is moved from right to left as viewed (i.e., as being part of a lower run of a clockwise rotation), as represented by arrow 2012, over a doctor blade that is generally designated 2014 and is suitably mounted within a tank 2016. In FIG. 2, the doctor blade 2014 is formed of a rigid bar with a smooth and regular cylindrical surface that extends across the entire width of the ITM 210.

Prior to passing over the doctor blade 2014, the underside of the ITM 210 (or lower run) is coated with an excess of treatment formulation (e.g. solution) 2030. The manner in which the excess of treatment formulation (e.g. solution) is applied to the ITM 210 is not of fundamental importance to the present invention; the ITM 210 may for example simply be immersed in a tank containing the liquid, passed over a fountain 1128 of the treatment formulation (e.g. solution) 2030 as shown in FIG. 2, or sprayed with an upwardly directed jet (NOT SHOWN).

As shown in the drawing, as the ITM 210 approaches the doctor blade 2014 it has a coating 2030 of liquid that is greater than or even significantly greater than the desired thickness. The function of the doctor blade 2014 is to remove excess liquid 2031 from the ITM 210 and ensure that the remaining liquid is spread evenly and uniformly over the entire surface of the ITM 210. In a non-limiting example, the doctor blade 2014 may be urged towards the ITM 210 while the latter is maintained under tension.

The skilled practitioner will recognize that treatment solution can be applied to the ITM by other means, and that excess liquid 2031 can be removed by other means.

Various materials may be involved in the operation of a digital indirect printing system such as those described herein. Examples of the materials include inks and ink components, substrate (paper or plastic or metal or any other material printed upon), cleaning solution(s), cooling solution(s), and treatment formulation(s).

As yet another example, the ITM 210 may comprise a surface release layer comprising silicon and silicon-based materials. Any of the above materials, singly or in any combination, can dry, chip, flake off, crumble, or otherwise create unwanted particles of foreign matter within the physical confines of the printing system. Such particles of foreign matter can adhere, for example, to the tacky surface of the treatment formulation 2030 forming a thin layer upon the surface of the ITM 210. The ITM 210 may circulate, or rotate, rapidly through the various stations making up a printing system and pick up such particles through physical or chemical adhesion or even through static electricity, and transport the particles, in the print direction, at speeds of more than 1.5 m/s or more than 2.5 m/s or more than 3 m/s.

Referring now to FIG. 3, some embodiments of a printing system are illustrated in further detail. Print heads 223 are shown to be disposed above the ITM 210 at a height or gap of G1 from the surface. While for the sake of convenience and clarity the print heads 223 are drawn as contiguous in FIG. 3 and in later figures, they need not be contiguous, and in some embodiments, there can be spacing between neighboring print heads, and other equipment such as, for example, heaters, can be juxtaposed between the neighboring print heads. G1 can be set as a minimum gap to account for irregularities in the layer of treatment formulation 2030 on the surface of the ITM 210, or it can be an average or typical gap taking into account such irregularities, or it can be defined based on consideration of the specifications of the printing system and its various components, including, but not exhaustively, condensation, jetting distance or drop size. Such irregularities can be on the order of individual microns or tens of microns depending on several factors, such as for example the design of treatment station 260. Gap G1 can be on the order of hundreds of microns or a thousand microns or more. In an example illustrated in the drawing, a particle 301 of foreign matter is transported by ITM 210 as it rotates in the direction shown by arrow 2012, also known herein as the print direction. The particle 301 can be larger in at least one dimension, or larger in its height above the surface of ITM 210, than gap G1. The term 'height above the surface of ITM 210' means the dimension substantially perpendicular to the surface of ITM 210 even if the ITM is 'vertical' relative to the ground such as, for example, the section of the ITM that is opposite the particle 301 in FIG. 3. If particle 301 continues to be transported by ITM 210 until arriving at or opposite image-forming station 212, it will collide in the future, or will potentially collide, with one or more of print bars 222A-222D, and in particular with print heads 223 therein. If the particle 301 is of sufficient mass or has sufficient momentum, it could damage a printing head 223 or a component thereof as a result of such a collision. Alternatively, even if no damage accrues to elements of the print heads 223 the particle could become stuck or lodged therein or thereupon.

It may desirable to detect the possibility of such a collision before it happens and to that end in accordance with the present invention a detection system 310 is provided upstream of the image-forming station 212. The detection system 310 is preferably configured so as to detect any particle 301 of foreign matter in advance of any potential future collision with an element of the image-forming station 212. The detection system 310 is more preferably configured so as to detect any such particle 301 of foreign matter with a pre-determined probability of colliding with an element of the image-forming station 212 with at least a pre-determined intensity of collision, and is additionally configured so that the particle 301 of foreign matter is detected in time for a collision-prevention or collision-avoidance action to be taken.

In FIG. 3, it can be seen that the detection system 310 is disposed at location L1 (meaning that at least an element of detection system 310 is facing location L1 on ITM 210) which is upstream of upstream roller 242. In other embodiments, the detection system is disposed at location L2 which is where ITM 210 encounters upstream roller 242, and where the ITM 210 is vertical and the normal vector to the ITM 210 is horizontal. It can be desirable to detect foreign matter at a location where the ITM 210 contacts a roller because the ITM 210 will tend to be under tension which can flatten out irregularities in the surface of the ITM 210 itself or in the thin coating of treatment 2030 formulation thereupon, which may otherwise complicate effective detection of foreign matter. In some alternative embodiments, the detection system is disposed at location L3 which is 90 degrees clockwise around upstream roller 242 in the print direction, i.e., the location on the upstream roller 242 where the ITM 210 becomes horizontal and a normal vector to the ITM 210 is vertical. In other alternative embodiments, the detection system is disposed at location L4 which is downstream of upstream roller 242 and upstream of the image-forming station 212.

The location on the ITM 210 faced by the detection system 310 is termed herein the 'detection location'. In embodiments in which a detection system 310 includes a detection element (NOT SHOWN in FIG. 3), the term 'detection location' will specifically refer to the location on the ITM which is faced by the detection element.

Figure 4A:
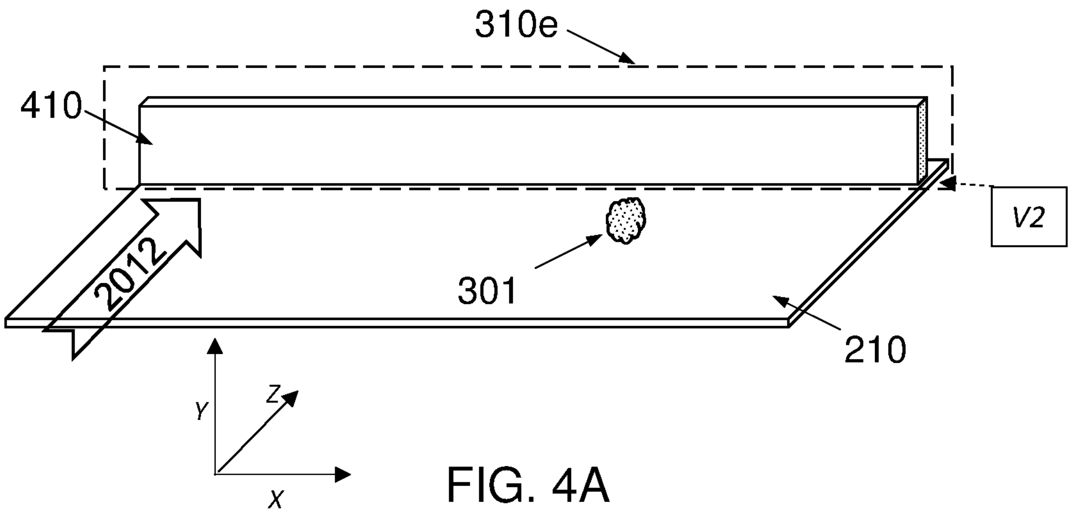
FIGS. 4A and 4B are perspective-view illustrations of examples of detection systems according to embodiments.

FIG. 4A contains a perspective view from "above" and to the "right", looking downstream and "down" at the image-carrying surface of ITM 210, with the terms "above" and "down" being used relative to a non-limiting example in which ITM 210 is locally horizontal in the area of detection system 310*e*. As the drawing shows, this perspective view can be defined by X, Y and Z axes wherein the X and Z axes are parallel to a floor (NOT SHOWN) and are orthogonal to each other, and together define a plane, and the y axis is orthogonal to that plane. Thus, 'horizontal' as used herein has the meaning of being disposed in or on an x-z plane that is parallel to a floor, and 'vertical' as used herein as the meaning of being disposed in a 'Y' direction and, specifically, orthogonal to the X-Z plane. As discussed above, ITM 210 can be locally horizontal or locally vertical in the area of a detection system (e.g., detection system 310*e*). It can be noted here that all other perspective FIGS. 4B, 5, 6A, 6C, 7, 8A and 17B utilize this same perspective to illustrate their respective embodiments.

Figure 4B:
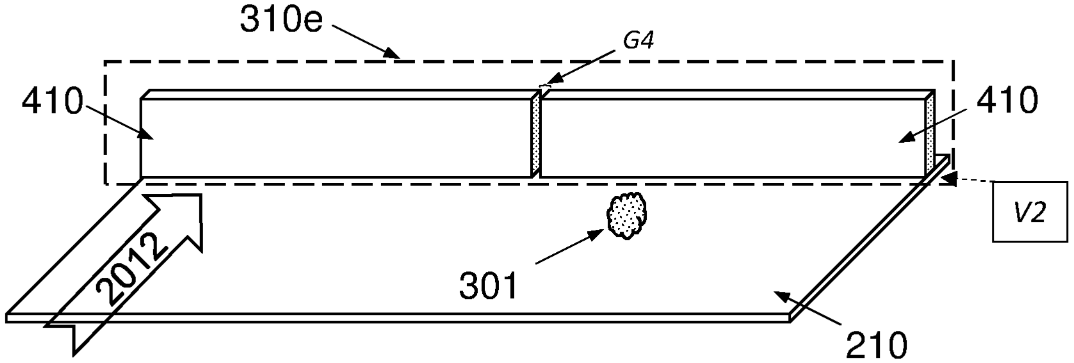
Figure 4C:
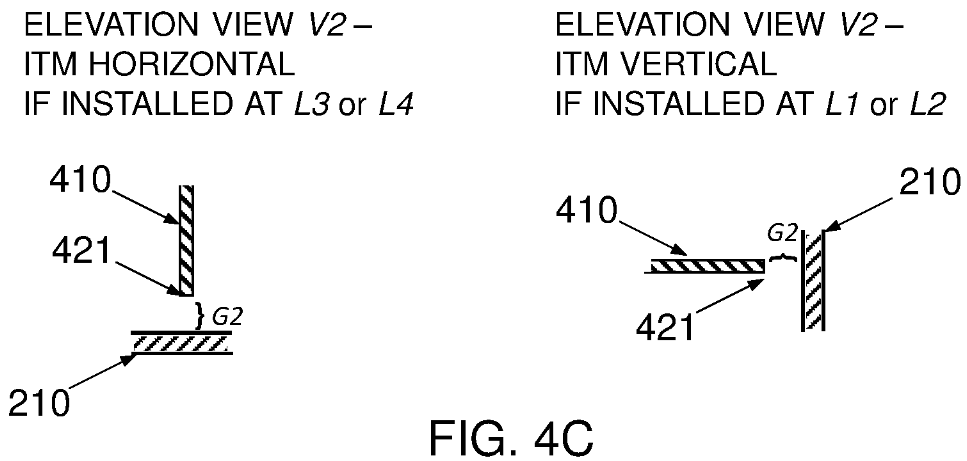
FIG. 4C contains two alternative elevation-view illustrations of components of detection systems according to embodiments.

In an embodiment illustrated in FIG. 4A, a detection system 310 comprises a mechanical detection system 310*e* which includes a blade 410 that is elongated and oriented in the cross-print direction, and displaced, as shown in FIG. 4C, with a proximate edge 421 adjacent to ITM 210 with a gap G2 therebetween. While the respective edges of blade 410 have been drawn with various shapes such as flat or curved, there is no importance to these shapes and the edges of the blade 410 can be of any shape. If the detection location is selected to be a location where the ITM 210 is vertical, for example if the mechanical detection system 310*e* is positioned facing either of locations L1 or L2 (as shown in FIG. 3), then as shown in FIG. 4C the blade 410 which will be horizontal during regular operation of the printing system in the absence of any impact with foreign matter, and otherwise if the detection location is selected to be a location where the ITM 210 is horizontal, for example if the mechanical detection system 310*e* is positioned facing either of locations L3 or L4 (as shown in FIG. 3), then as shown in FIG. 4C the blade 410 will be vertical during regular operation of the printing system in the absence of any impact with foreign matter. As shown in FIG. 4A, the width of the blade 410 extends along the majority of the width of the ITM 210, and as shown in FIG. 4B, a blade 410 can comprise a plurality of abutting blades 410 provided side-by-side across the width of the ITM 210, with a gap G4 between each pair of abutting blades 410. In some embodiments, the aggregate width of all blades 410 excluding gaps G4 is at least 99% of the width of the ITM 210. In some embodiments, the aggregate width of all blades 410 excluding gaps G4 is at least 99.5% of the width of the ITM 210. In some embodiments, the aggregate width of all blades 410 excluding gaps G4 is at least 99.7% of the width of the ITM 210.

The blade 410 is preferably a 'floating blade.' This means that the rotational movement of proximate edge 421 is relatively unrestrained if blade 410 is struck at the proximate edge 421 or near the proximate edge 421 on a face of the blade 401 (for example at point P1 in FIG. 5A), by a particle 301 of foreign matter transported by the ITM 210.

Figure 5A:
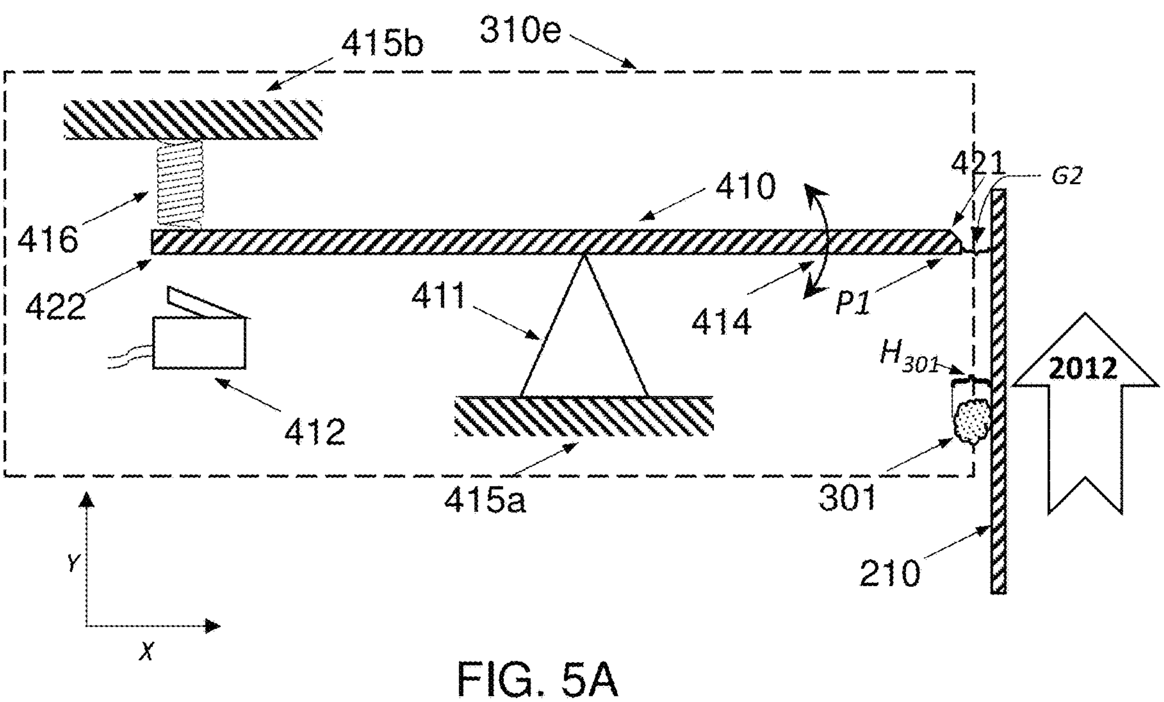
FIGS. 5A, 5B, 5C and 5D are elevation-view illustrations of components of a detection system according to embodiments.

FIG. 5A illustrates a non-limiting example of a floating blade 410 with a proximate edge 421 adjacent to or facing the surface of ITM 210 and, as illustrated in FIG. 7C, displaced therefrom with a gap G2 therebetween. FIGS. 5A, 5B, 5C and 5D all show the ITM 210 as being locally vertical and the blade 410 as being horizontal for purposes of convenience only, and in some embodiments the inverse is true, and therefore it should be understood that the relative directions of the key elements as shown in these figures is only for purposes of illustrating the structural and functions of the various system elements depicted. As per the illustration, the blade 410 is pivotable with a degree of freedom indicated by arrow 414, being disposed upon pivot mechanism 411 which is fixedly installed on rigid frame element 415*a*. Considering that FIG. 5A is an elevation view, a skilled practitioner will understand that arrow 414 indicates pivoting or rotation about an axis that is orthogonal to the vector of print direction 2012 and parallel to the width dimension of ITM 210, as will now be explained. FIG. 5A shows an X-Y axis (which was shown in perspective in FIG. 5A as also including a Z-axis which cannot be seen here because FIG. 5*a* is a two-dimensional projection), such that the print direction 2012 can be understood to be upwards in the Y direction. It can be seen that the cross-section of the blade 410 extends lengthwise from distal edge 422 to proximate edge 421 in the X direction and a thickness of the blade 410 is illustrated in the Y direction. Thus, the width of the blade 410 is necessarily in the Z direction (NOT SHOWN). Similarly, the width of the ITM 210 is in the Z direction, and the rotation axis of the blade 410 about pivot mechanism 411 is likewise disposed in the Z direction. The pivot axis therefore extends across the width of blade 410.

In other embodiments (NOT SHOWN) pivot mechanism 411 can be an integral part of rigid frame element 415*a*, for example, an elongated spike or elongated triangle of rigid frame element 415*a* material such as a metal that has the same placement and function as the pivot mechanism 411 which has been shown as a separate element in the drawings.

Any pivot mechanism 411 can have a sharp top-of-the-triangle edge as shown for convenience in the drawings or it can be, for example, a rounded edge, as long as the blade 410 is free to pivot on it as described above with respect to degree-of-freedom arrow 414. The distal edge 422 of blade 410 is linked to rigid frame element 415*b* by linking means 416, which in this example includes an extension spring. Linking means 416 in its at-rest configuration (which means during regular operation of the printing system in the absence of any impact between foreign matter and the blade 410) including position, length and tension, serves to preserve the horizontality of blade 410 and to define the precise vertical location of the proximate edge thereof. In some alternative embodiments, the linking means 416 can include a pneumatic resistance piston and cylinder (NOT SHOWN). The linking means 416 acts to limit, reduce or dampen the downward motion of the distal edge 422 of blade 410 should an upward force be applied to the proximate 421 edge of the blade 410. The discussion above has been used to explain an example in which the blade 410 is horizontal when the linking means 416 is in the at-rest position, but a skilled artisan will understand that in other embodiments the linking means 416 can serve to maintain a position of the blade 410 that is not horizontal, i.e., either the distal edge 422 is higher than the proximate edge 421, or vice versa. Such a determination of the exact angle of repose of the blade 410 in the at-rest configuration will be made by the system designer when considering parameters such as, and not exhaustively, the space allotted, the dimensions of the blade 410 and the mechanical characteristics of the linking means 416. Similarly, it should be understood that if the mechanical detection system 310*e* is disposed vertically at a location at which the ITM 210 is locally horizontal, then blade 410 can be vertical or at an angle of repose that is close to vertical.

Blade 410 is preferably configured so that it cannot rise up and lose contact with pivot mechanism 411 when an upward force is applied at the proximate end, which if it happened would reduce the downward movement of the distal edge. For example, the weight of the blade 410 can be adjusted for this purpose, or additional weight can be added to the blade, generally or, alternatively, locally along the area of the pivot mechanism 411. Alternatively, the blade 410 can be connected to pivot mechanism 411 in a way that allows the blade 410 freedom to pivot in the direction indicated by arrow 414 but which does not restrict rotational movement within the range desired. This connection (NOT SHOWN) can comprise any known mechanical connectors including, but not exhaustively, nails, rivets, bolts, screws, wire loops, hold-down brackets, or bearings. Alternatively blade 410 can be 'held down' atop pivot mechanism 411 by means of a mechanical member (NOT SHOWN) attached fixedly to a rigid frame member such as, for example, rigid frame member 415*b*.

Figure 5B:
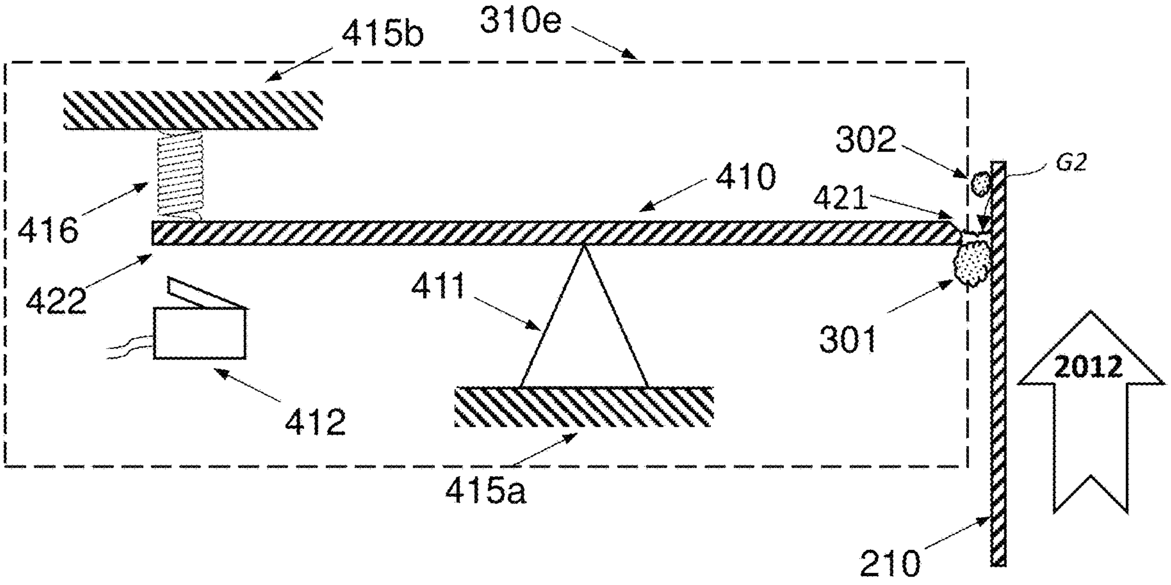

The detection system 310*e* illustrated in FIGS. 5A, 5B, 5C and 5D is configured so that a particle 301, 302 of foreign matter transported by ITM 210 in the direction indicated by arrow 2012 will impact with the proximate edge of blade 410 if the extension $H_{301}$ of particle 301, 302 from the surface of the ITM 210 (i.e., the dimension that would be called the 'height' 'above' the surface if the ITM 210 were horizontal and which is shown in FIG. 5A as $H_{301}$) is greater than the value of gap G2 between the proximate edge of blade 410 and the surface of the ITM 210. As shown in FIG. 5B, particle 302 of foreign matter is smaller than gap G2 and passes by blade 410 without impacting it, while larger particle 301 is larger than G2 and impacts the blade 410. Thus it can be seen that the value of gap G2, i.e., the proximity of blade 410 to the surface of the ITM 210 is a design choice, based at least partially on the assumption that foreign matter particles that stick out from the surface of the ITM 210 less than the value of G2 will not collide, or are unlikely or even extremely unlikely to collide, with any print head 222 and can be 'ignored'.

Figure 5C:
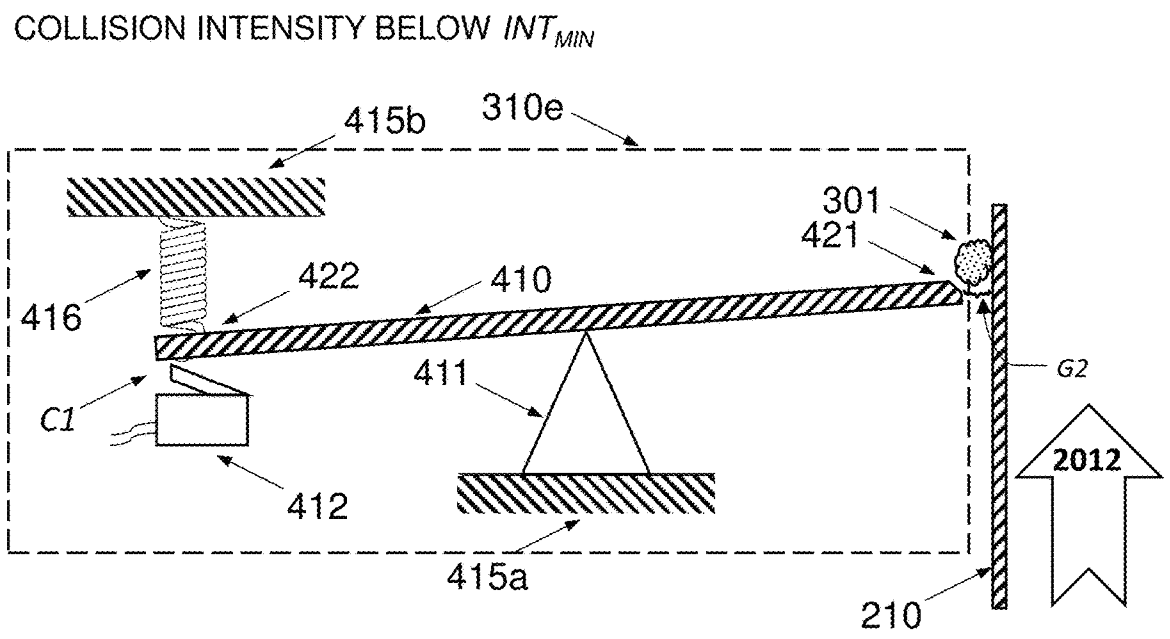
Figure 5D:
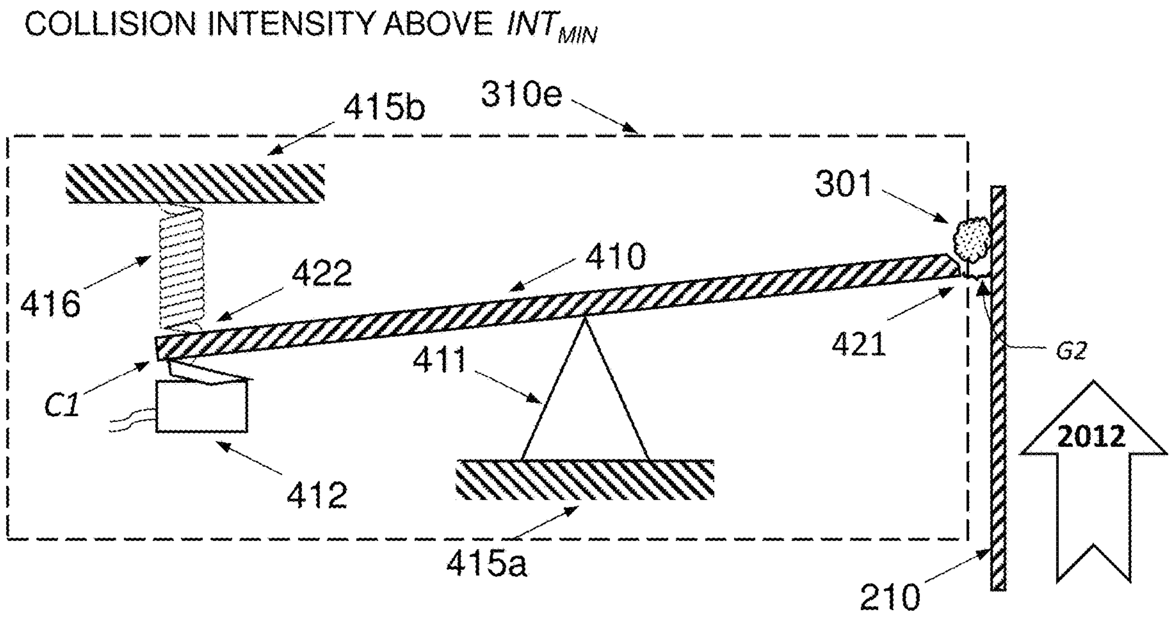

In FIG. 5C, which illustrates the detection system 310*e* at a later time than in FIG. 5A or FIG. 5B, it can be seen that particle 301 of foreign matter has impacted the proximate edge 421 of blade 410, causing blade 410 to pivot on pivot mechanism 411, imparting a 'counter-clockwise' (relative to this non-limiting illustrated example) rotational force to blade 410 and causing a downward movement of the distal edge 422 of blade 410. Linking means 416 limits or dampens the downward movement of distal edge 422 so that the downward movement of distal edge 422 caused by a particle 301 of foreign matter impacting the proximate edge 422 of blade 410 is limited in its extent, depending on the intensity of the impact.

According to embodiments, a mechanical detection system includes a blade-orientation detector that identifies the orientation of a blade and/or and detects the deflection of the blade, for example after foreign matter transported by the ITM has impacted the blade and caused it to pivot. A blade-orientation detector may comprise any combination of mechanical, magnetic, optical, electrical and software elements. An example of a mechanical component of a blade-orientation detector is a limit switch. As shown in the non-limiting examples of FIGS. 5A, 5B, 5C and 5D, the mechanical detection system 310*e* can additionally comprise a limit switch 412 configured to switch on or facilitate an electric current when physically contacted by the distal edge 422 of the blade 410. In a properly-designed mechanical detection system 301*e*, the limit switch 412 and other components of the system will be configured so that the limit switch 412 is contacted by the distal edge 422 as a result of an impact (between particle 301 of foreign matter and proximate edge 421) of sufficient intensity as to warrant the performance of an action that will prevent the potential future collision of the particle 301 with a print head. The electric current switched on or facilitated by the limit switch 412 can be used to automatically perform an action, as will be described later. An example of a suitable limit switch 412 is any miniature snap-action switch such as the 'Micro Switch™' products known in the electrical and mechanical industries. The term micro switch will be used herein interchangeably with other known terms such as limit switch or snap-action switch and means any electric switch that is actuated by physical force, for example through the use of a tipping-point mechanism.

Minimum collision intensity '$INT_{MIN}$' is used herein to mean the minimum collision intensity between foreign matter and a print head that has a likelihood of causing damage to a print head. Minimum collision intensity $INT_{MIN}$ can represent or be calculated by either momentum or force, and its value can be calculated by the system designer, or, alternatively, determined empirically, through trial and error, or after the fact. For example, a designer might calculate or determine that the collision intensity resulting from a collision with a print head by a particle of foreign matter with mass of 5 milligrams traveling (i.e., transported by an ITM)

at a speed of 2 meters per second would be the minimum collision intensity that can damage a print head. The particle has a momentum of 10 mg-m/sec. If it were to strike a stationary print head and decelerate to zero speed in one millisecond, the stopping force acting on the particle would be 10 g-m/sec/sec (for the sake of a simplified example, this ignores the effects of deformation of either the particle or print head, and assumes that the print head doesn't move). Thus, minimum collision intensity $INT_{MIN}$ in this example could be expressed either as particle momentum of 10 mg-m/sec or collision force of 10 g-m/sec/sec. The intensity of an impact between foreign matter and a detector or detection element such as the proximate edge 421 of blade 410 can be used to predict the intensity of a potential future collision between foreign matter and a print head, and therefore $INT_{MIN}$ can be used in determining the minimum intensity of impact intensity between a particle 301 of foreign matter and the proximate edge 421 of blade 410 that should trigger an action to avoid or prevent a future collision.

It should be obvious to a skilled practitioner that a safety factor may be taken, so that for example an $INT_{MIN}$-derived minimum impact intensity for purposes of causing or allowing blade 410 to contact limit switch 412 and trigger a collision-prevention action is set at a lower impact intensity than the actual theoretical or empirical minimum collision intensity that would damage a print head. Thus, minimum impact intensity as discussed in connection with FIGS. 5C and 5D may be two-thirds or half or one-third or any other fraction of the momentum or collision force actually required for a particle of foreign matter to cause damage to a print head (i.e., $INT_{MIN}$), depending on the safety margin desired. It will be understood by the skilled practitioner that an impact will only occur if the extension of the foreign matter, shown as $H_{301}$ in FIG. 5A, is larger than gap G2 between the detector (the proximate edge 421 of blade 410) and the surface of the ITM 201.

The linking means 416 is preferably configured so that an impact with intensity greater than or equal to a minimum collision intensity constant $INT_{MIN}$ would cause the distal edge to move downwards to an extent that it contacts and activates limit switch 412 at contact point C1, and so that an impact with intensity less than $INT_{MIN}$ would not cause the distal edge to move downward (or, in some embodiments, prevent the distal edge from moving downward) to the extent that it contacts and activates limit switch 412. This can be accomplished by selecting, for example, an extension spring with suitable characteristics of length and tension. As can be seen in the drawings, the impact intensity in FIG. 5C is below $INT_{MIN}$ and the distal edge of blade 410 does not contact limit switch 412 at contact point C1, while in FIG. 5D the impact intensity is greater than $INT_{MIN}$ and the distal edge of blade 410 in fact contacts limit switch 412 at contact point C1.

Figure 6A:
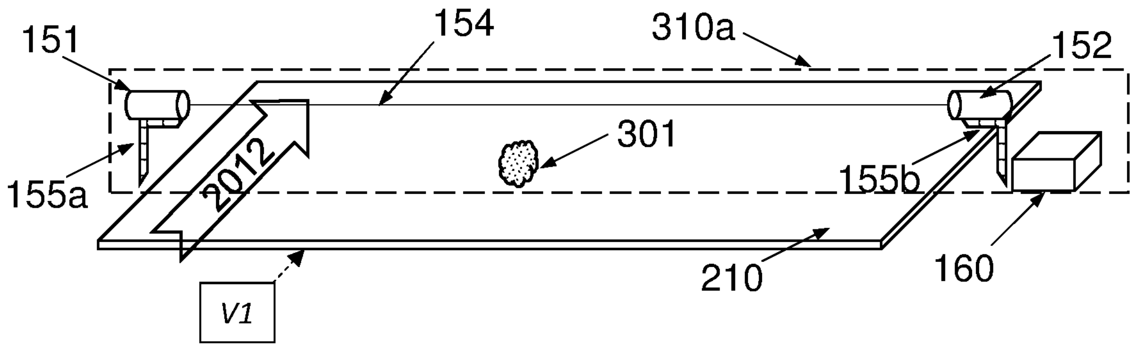
FIG. 6A is a perspective-view illustration of another example of a detection system according to embodiments.
Figure 6B:
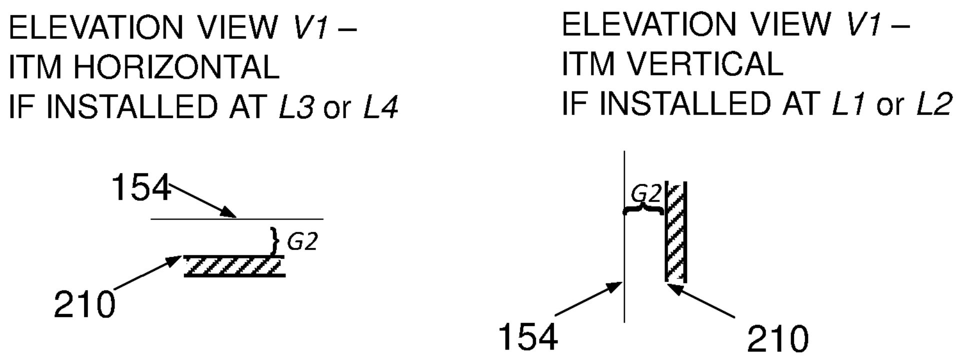
FIG. 6B contains two alternative elevation-view illustrations of components of the detection system illustrated in FIG. 6A.

FIG. 6A illustrates an embodiment in which a detection system 310 comprises a laser-based detection system 310*a* that includes a miniature laser transmitter 151, a miniature laser receiver 152, respective mountings 155*a* and 155*b*, and preprogrammed electronic circuitry 160 configured to process signals from the laser transmitter 151 and laser receiver 152 and calculate whether a particle 301 of foreign matter that interrupts or traverses laser beam 154 when transported thereby by rotating ITM 210, is of sufficient size and mass, when taken together with the transport speed of particle 301, to warrant or trigger a collision-prevention response that would take effect before the particle 301 reaches the image-forming station 212. In the embodiment, laser beam 154 is parallel to the surface of the ITM 210 and traverses the width of the ITM 210, displaced therefrom by a height or gap G2 as shown in FIG. 6B. Examples of a suitable laser detection system in this embodiment are LV-S71 and LV-S72 Small Beam Spot Thrubeam laser sensors, available commercially from Keyence Corporation of America of Itasca, Illinois, USA. Gap G2 in any of the embodiments herein is preferably smaller than gap G1 which characterizes the gap between print heads 223 and the ITM 210, so as to predict a future or potential collision with a print head 223 of any foreign matter particle 301 of a size that is greater than G1, equal to G1, or somewhat smaller than G1. For example, the value of gap G2 can be set to equal no more than 50% or no more than 70% or no more than 90% of the value of G1, or alternatively at least 50% or at least 70% or at least 90% of the value of G1.

Figure 6C:
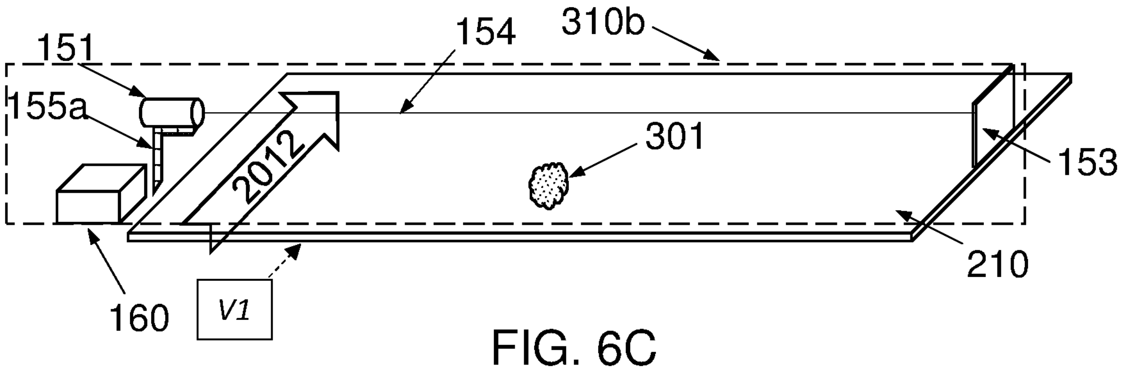
FIGS. 6C, 7 and 8A are perspective-view illustrations of other examples of detection systems according to embodiments.

In an alternative embodiment illustrated in FIG. 6C, a laser detection system 310*b* can include a miniature laser transmitter 151 and mounting 155*a*, a laser reflector 153, and preprogrammed electronic circuitry 160 configured to process signals from the laser transmitter 151 and calculate whether a particle 301 of foreign matter that interrupts or traverses laser beam 154 when transported thereby by rotating ITM 210 is of sufficient size and mass, when taken together with the transport speed of particle 301, to warrant or trigger a collision-prevention response that would take effect before the particle 301 reaches the image-forming station 212. An examples of a suitable laser detection system in this embodiment is an LV-S61 Small Beam Spot Retro-Reflective laser sensor, available commercially from Keyence Corporation of America of Itasca, Illinois, USA.

Figure 7:
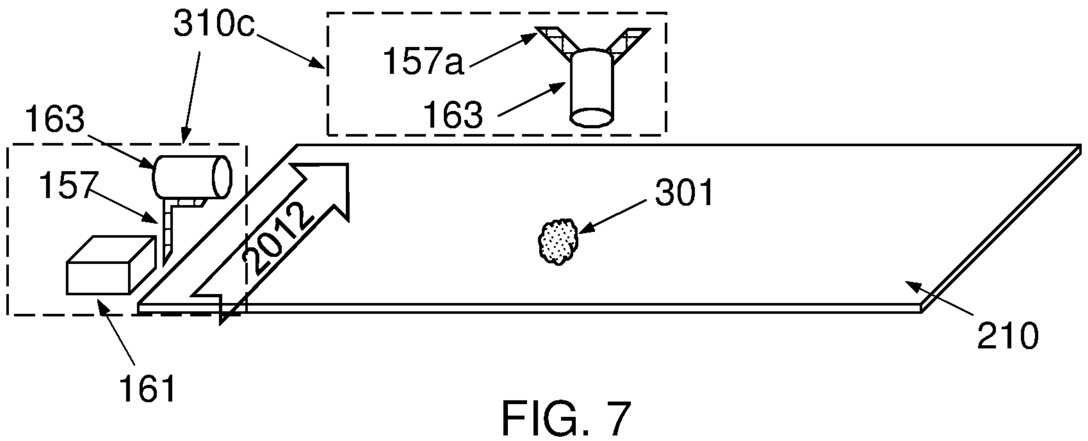

In an example, a blade-orientation detector can comprise a camera and image-processing software. FIG. 7 illustrates an embodiment in which a detection system 310 comprises a visual camera system 310*c* which includes one or more visual-range cameras 163, at least one of side mounting 157 and opposing mounting 157*a*, and preprogrammed electronic circuitry 161 configured to process images from the one or more cameras 163 and calculate whether a particle 301 of foreign matter imaged by the one or more cameras 163 is of sufficient size and mass, when taken together with the transport speed of particle 301 on the ITM 210, to warrant or trigger a collision-prevention response that would take effect before the particle 301 reaches the image-forming station 212. As seen in the drawing, one or more cameras 163 can be deployed on the side of the ITM 210 to image the moving surface of the ITM 210, and in addition or alternatively one or more cameras can be deployed opposing, or facing, the moving ITM 210 at a distance that takes into account the capture angle of the camera 163 and the width of the ITM 210; it should be obvious to one skilled in the design of imaging systems that coverage of the ITM 210 can be divided widthwise among two or more cameras 163 to allow the cameras to be disposed closer to the ITM 210. An example of a suitable camera in this embodiment is an In-Sight® Micro 8000 series smart camera available commercially from Cognex Corporation of Natick, Massachusetts, USA. Visual cameras mentioned herein can record still images and/or moving images.

Figure 8A:
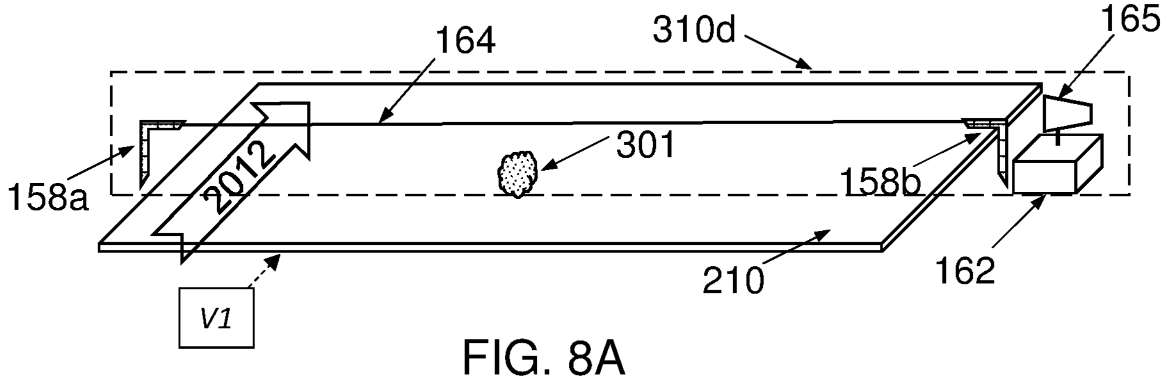
Figure 8B:
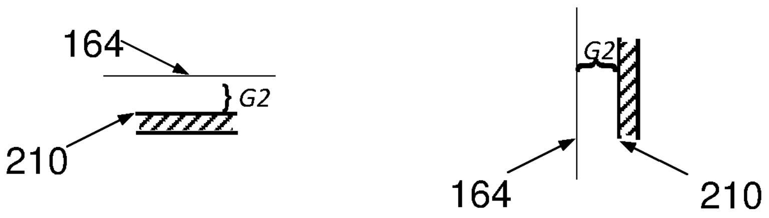
FIG. 8B shows two alternative elevation-view illustrations of components of the detection system illustrated in FIG. 8A.

In another embodiment, as illustrated in FIGS. 8A and 8B, a detection system 310 comprises an acoustic-based detection system 310*d* that includes a string 164 that comprises a flexible material held under tension, for example by adjustable string mounting elements 158*a* and 158*b*. The string 164 can comprise a single material such as, for example, nylon or steel, or a plurality of materials where a first material, for example a bronze alloy, is wound around a core material such as, for example steel or nylon. The string 164 can alternatively or additionally comprise other materials, the goal of material selection being vibration at a desired pitch or range of pitches and at a desired amplitude or range of amplitudes when struck by a particle 301 of foreign material transported by a rotating ITM 210. As shown in FIG. 8B, the string is preferably displaced from the surface of the ITM 210 with a gap G2 therebetweeen, widthwise across the ITM 210 such that the mounting elements 158*a* and 158*b* are disposed on either side of the ITM 210. The acoustic-based detection system 310*c* preferably additionally includes a microphone 165 and preprogrammed electronic circuitry 162 configured to process tones generated by the string 164 and calculate whether a particle 301 of foreign matter that collides with string 164 when transported by rotating ITM 210 is of sufficient size and mass, when taken together with the transport speed of particle 301, to warrant or trigger a collision-prevention response that would take effect before particle 301 reaches the image-forming station 212.

Figure 9:
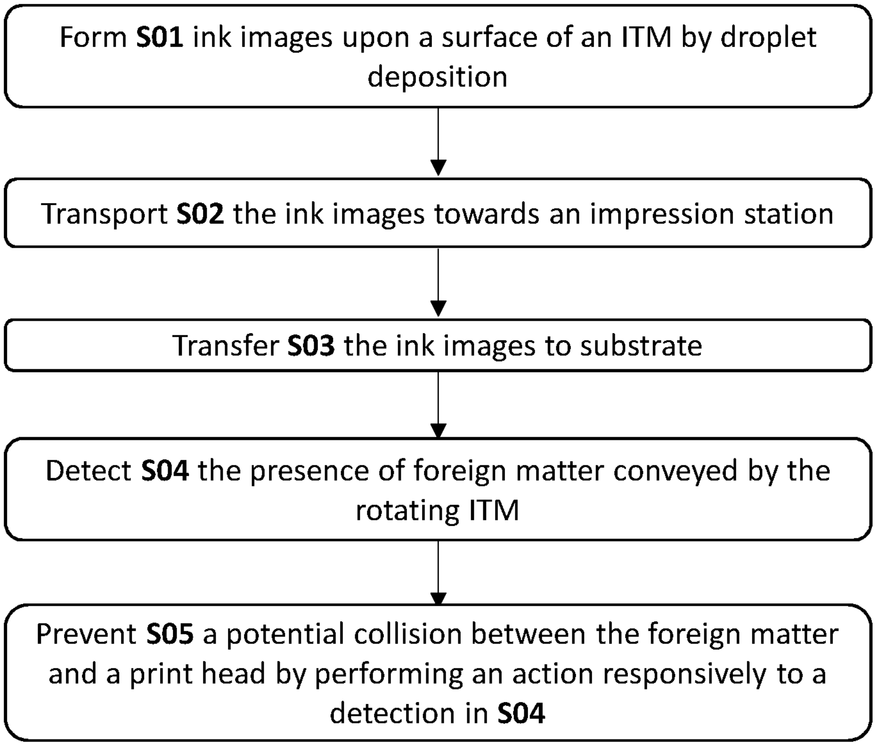
FIGS. 9, 10, 11 and 12 are flowcharts of methods for operating a printing press that includes a detection system according to embodiments.

Referring now to FIG. 9: In some embodiments, a method of operating a printing system comprises:

a) Step S01 forming ink images upon a surface of an ITM 210 by droplet deposition;

b) Step S02 transporting the ink images towards an impression station;

c) Step S03 transferring the ink images to substrate;

d) Step S04 detecting the presence of foreign matter conveyed by the rotating ITM; and e) Step S05 preventing a potential collision between the foreign matter and a print head by performing an action responsively to a detection in S04.

In some embodiments, not all of the steps of the method are necessary.

In some embodiments Step S04 is performed by means of a detection system comprising at least one of a laser detector system, an image-processing system comprising a visual camera, an acoustic detection system and a mechanical detection system. Examples of a suitable laser detector system have discussed above in connection with FIGS. 6A, 6B and 6C. An example of a suitable image-processing system comprising a visual camera has been discussed above in connection with FIG. 7. An example of a suitable acoustic detector system has been discussed above with reference to FIGS. 8A and 8B. An example of a suitable mechanical detection system has been discussed above in connection with FIGS. 4A, 4B, 4C, 5A, 5B, 5C and 5D.

In some embodiments, Step S05 includes performing a collision-avoiding action within an allowable response time, which is the length of time that elapses between the detection of foreign matter and the arrival of the foreign matter at the position of the print head, or at a point on the ITM 210 facing the print head. This allowable response time for preventing the potential collision is defined by the rotational speed of the ITM and a distance along the ITM surface between the detection location (at which the presence of foreign matter is detected) and the print head (or an upstream location on the ITM surface facing the print head). The response time can be less than one second or less than 500 milliseconds or less than 200 milliseconds.

Figure 10:
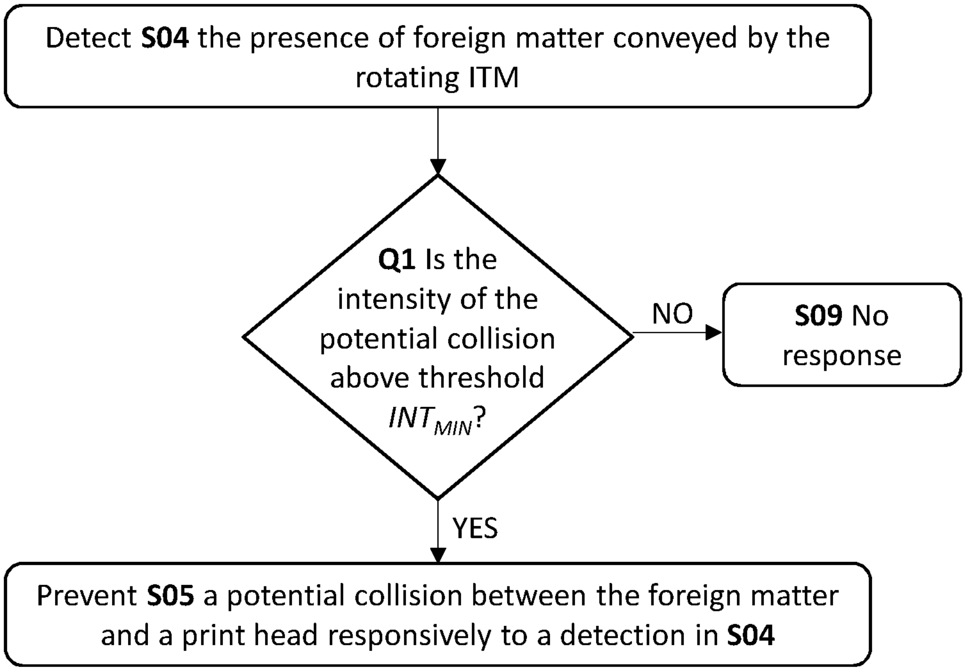

In FIG. 10 it can be seen that a method of operating a printing system such as the one discussed above with reference to FIG. 9 can include a calculation, determination, or designed-in pass/fail Q1 of whether the anticipated intensity of the potential collision with the print head will be above a predetermined threshold of minimum collision intensity $INT_{MIN}$ or not, and depending on the outcome the method can include a non-response as in Step S09, i.e., not performing an action to prevent a potential collision, or alternatively performing a collision-prevention action of Step S05. The calculation or determination can be made by detector systems that include electronic circuitry comprising programmed instructions such as discussed above with reference to FIGS. 6A, 6B, 6C, 7, 8A and 8B. The designed-in pass/fail of whether the anticipated intensity of the potential collision will be above a predetermined threshold or not can be resolved with reference to the discussion of the detection system that includes a blade 410 as discussed above with reference to FIGS. 4A, 4B, 4C, 5A, 5B, 5C, and 5D.

In some embodiments, Step S05 of preventing a potential collision includes raising the print head before the foreign matter can collide with it.

In some embodiments, Step S05 of preventing a potential collision includes moving a surrogate object into a location upstream of the print head so that the foreign matter collides with the surrogate object instead of with the print head.

Figure 11:
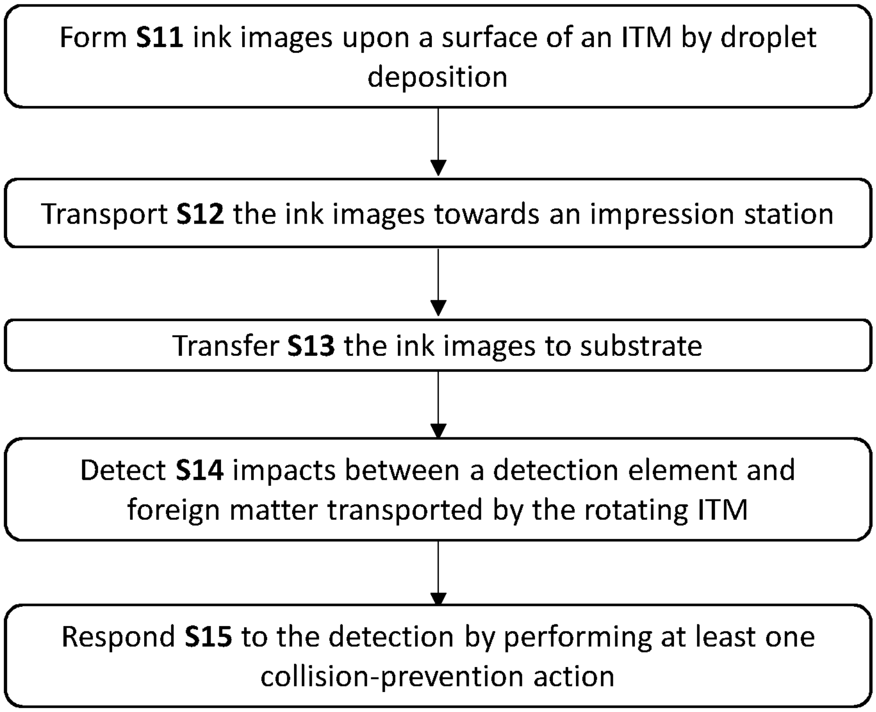

FIG. 11 illustrates embodiments in which a method of operating a printing system comprises:

a) Step S11 forming ink images upon a surface of an ITM 210 by droplet deposition;

b) Step S12 of transporting the ink images towards an impression station;

c) Step S13 of transferring the ink images to substrate;

d) Step S14 of detecting impacts between a detection element and foreign matter transported by the rotating ITM; and e) Step S15 of responding to the impact detection by performing at least one collision-prevention action.

In some embodiments, not all of the steps of the method are necessary.

An example of suitable apparatus for carrying out Step S14, detecting impacts between a detection element and foreign matter transported by the rotating ITM 210, is any of the embodiments discussed above in connection with FIGS. 4A, 4B, 4C, 5A, 5B, and 5D.

In some embodiments, Step S15 includes performing a collision-avoiding action within the length of time that elapses between the detection of foreign matter and the arrival of the foreign matter at the position of the print head before it was lifted away from the ITM, or at a point on the ITM facing the print head. This allowable response time for preventing the potential collision is defined by the rotational speed of the ITM and a distance along the ITM surface between the location at which the presence of foreign is detected and the print head or at an upstream location on the ITM surface facing the print head. The response time can be less than one second or less than 500 milliseconds or less than 200 milliseconds.

Figure 12:
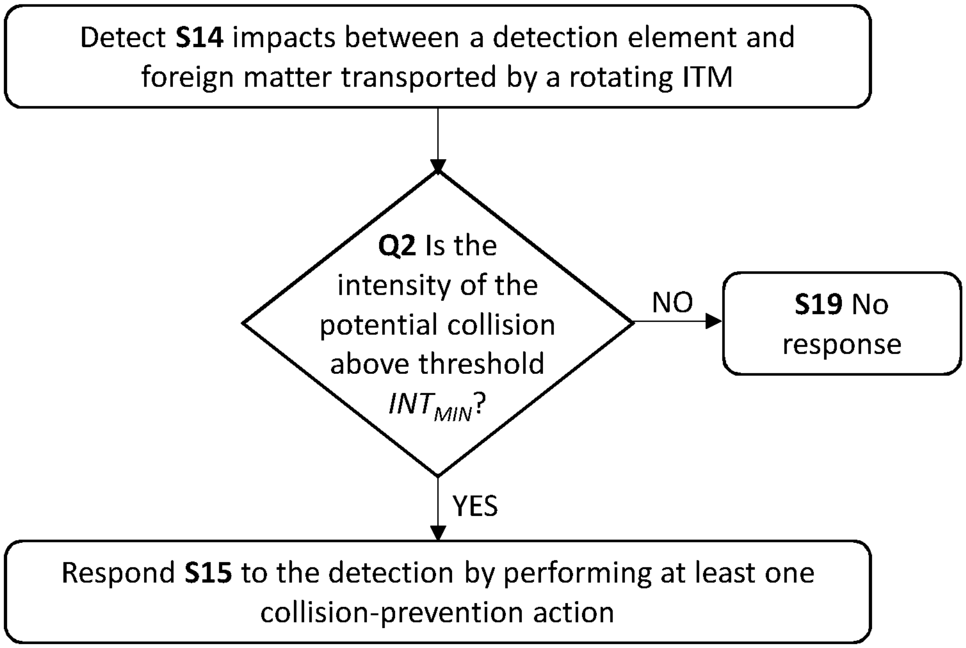

In FIG. 12 it can be seen that a method of operating a printing system such as the one discussed above with reference to FIG. 11 can include a designed-in pass/fail Q2 of whether the anticipated intensity of the potential collision with the print head will be above a predetermined threshold of minimum collision intensity $INT_{MIN}$ or not, and depending on the outcome the method can include a non-response as in Step S19, i.e., not performing an action to prevent a potential collision, or alternatively performing a collision-prevention action of Step S15. The designed-in pass/fail of whether the anticipated intensity of the potential collision will be above a predetermined threshold or not can be resolved with reference to the discussion of the detection system that includes a blade 410 as discussed above with reference to FIGS. 4A, 4B, 4C, 5A, 5B, and 5D.

In some embodiments, Step S15 of preventing a potential collision includes raising the print head before the foreign matter can collide with it.

In some embodiments, Step S15 of preventing a potential collision includes moving a surrogate object into a location upstream of the print head so that the foreign matter collides with the surrogate object instead of with the print head.

Figure 13A:
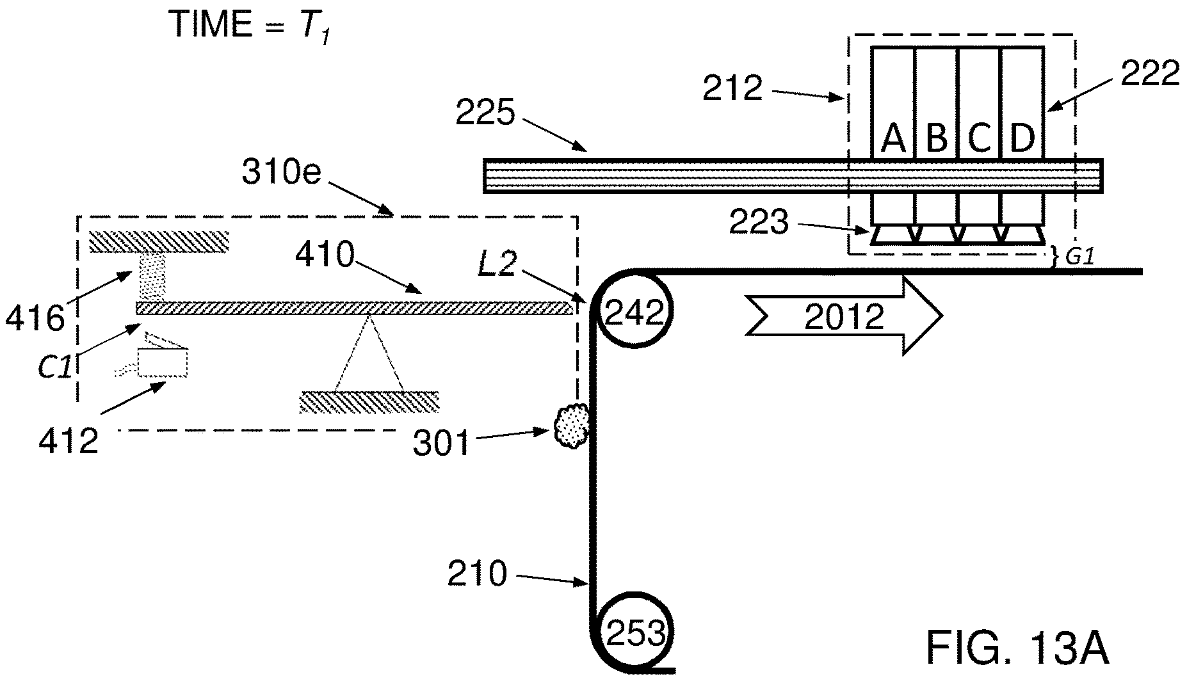
FIGS. 13A, 13B, 14A and 14B are elevation-view illustrations of components of a printing system that includes a detection system according to embodiments.
Figure 13B:
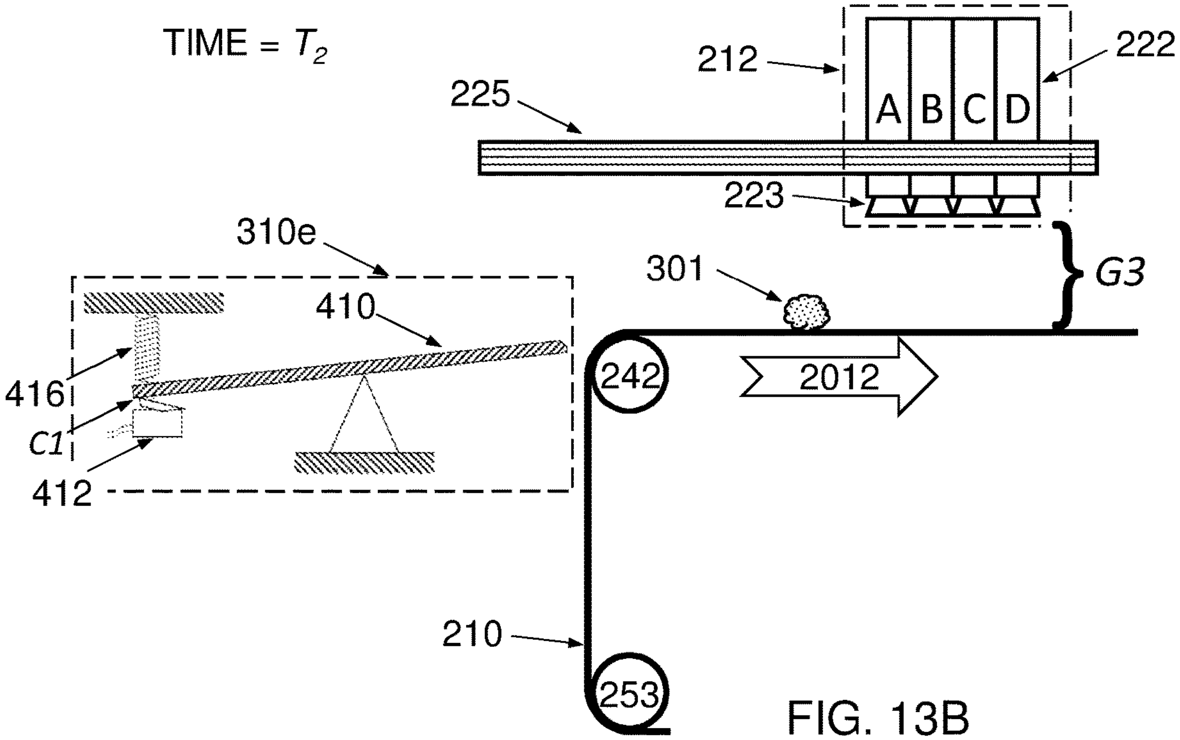

Referring now to FIGS. 13A and 13B, embodiments of some components of a printing system 100 are illustrated, including a detection system 310*e*, for example any of the systems illustrated in FIGS. 4A, 4B, 4C, 5A, 5B, 5C, and 5D. The detection system 310*e* is disposed so that the proximate edge 421 of the blade 410 is opposite location L2. FIG. 13A illustrates the status of the system at Time=$T_1$, when the particle 301 of foreign matter is still upstream of the detection location L2, and the blade 410 is still horizontal. FIG. 13B illustrates the status of the system at Time=$T_2$, after the particle 301 has impacted the proximate edge of blade 410, causing the blade 410 to pivot, and additionally the particle 301, continuing to be transported by the ITM 210 after the impact, is arriving at the location of where a collision with a print head 223 would potentially take place. Because the intensity of the impact was greater than $INT_{MIN}$, like in the example illustrated in FIG. 5D, that intensity was sufficient for the distal end 422 of the blade 410 to overcome resistance of linkage means 416 and contact the micro switch 412 at contact point C1.

Contacting the micro switch 412 is an example of an indication of detecting an impact as in Step S14 in FIG. 12, and with Q2 the designed-in pass/fail "Is the intensity of the impact above threshold $INT_{MIN}$?" being answered in the affirmative. A collision-prevention action as per Step S15 in FIG. 12 has been performed before $T_2$, i.e., before the end of the allowable response time which ends when the particle 301 (which impacted the blade 410) arrives at print head 223. The collision-prevention action that was performed included raising the print bars 222 with the print heads 223 before the foreign matter can collide with a print head. The gap between the print heads 223 and the ITM 210 is no longer equal to G1 as it was in FIG. 13A but is now G3, which is larger than G1. In an example, G1 is 1 mm and G3 is 15 mm. In another example, G1 is 2 mm and G3 is between 4 mm and 10 mm. In yet another example G1 is 800 microns and G3 is 8 mm. In the embodiment shown in the drawing, a print bar frame 225 was used to lift all of the print bars 222 simultaneously as part of the collision-prevention action. In alternative embodiments (NOT SHOWN) one or more individual print bars 222 can be lifted in the same manner described above if that would be sufficient in the specific printing system's design to prevent a collision.

Figure 14A:
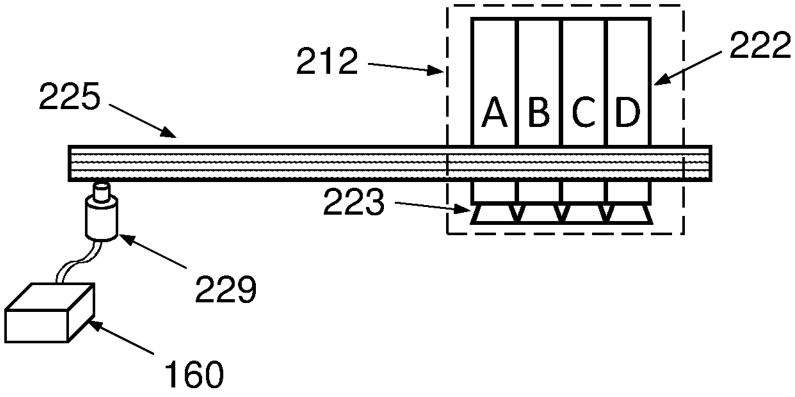

In embodiments illustrated in FIG. 14A, preprogrammed electronic circuitry 160 provided in various embodiments for detection as discussed herein, is in electrical communication with an electric actuator 229 configured to lift print bars 222 by raising print bar frame 225. Thus, when a calculation or determination is made by preprogrammed electronic circuitry 160, for example the designed-in pass/fail Q1 "Is the intensity of the impact above threshold $INT_{MIN}$" discussed with reference to FIG. 10 is affirmatively resolved, and it is desired to prevent a potential collision between foreign matter and a print head as in Step S05 of FIG. 10, electric actuator 229 can be used to lift the print heads 223 further away from the surface of ITM 210, for example to a predetermined distance of G3. It should be obvious that in this discussion of FIG. 14A, preprogrammed electronic circuitry 160 can be replaced by preprogrammed electronic circuitry 161 or preprogrammed electronic circuitry 162 depending on the respective embodiment of detection system 310*a* or 310B or 310*c* or 310*d* selected.

Figure 14B:
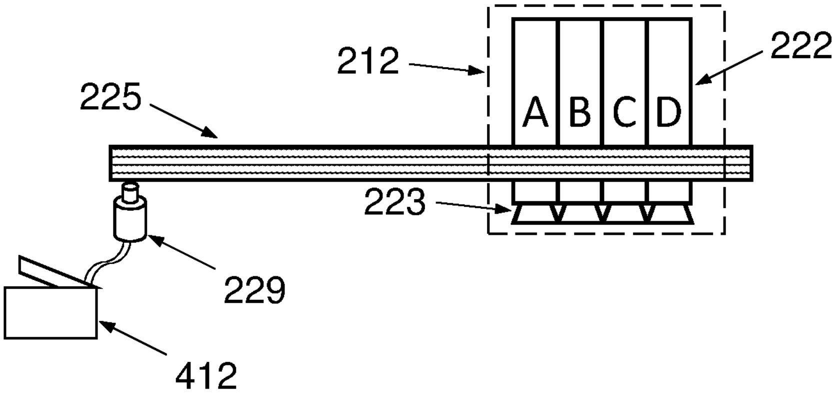

In embodiments illustrated in FIG. 14B, limit switch 412 provided in various embodiments for impact detection as discussed herein, is in electrical communication with an electric actuator 229 configured to lift print bars 222 by raising print bar frame 225. Thus, when for example the designed-in pass/fail Q2 "Is the intensity of the impact above threshold $INT_{MIN}$?" discussed with reference to FIG. 12 is affirmatively resolved in that the limit switch 412 has been contacted by blade 410 at contact point C1 as discussed above, and it is desired to respond to the impact detection by performing at least one collision-prevention action as in Step S15 of FIG. 12, electric actuator 229 can be used to lift the print heads 223 further away from the surface of ITM 210, for example to a predetermined distance of G3.

An example of a suitable electric actuator for any of the above embodiments is model PA-15 High-Speed Linear Actuator, available from Progressive Automations of Richmond, British Columbia, Canada. However, any high-speed actuator capable of performing the collision-prevention action within the response time is appropriate. A skilled artisan will understand that more than one electric actuator may be needed to lift the print bars effectively within the allowed response time, and also that a pneumatic actuator may be substituted for an electric actuator. Moreover, the use of a piston actuator is a design choice disclosed as an example and is only one of multiple possible ways of effectively lifting the print bars, and it would be obvious to a system designer that any manner of mechanical apparatus can be designed to achieve the same result of rapidly lifting the print bars within the allowed response time.

Figure 15:
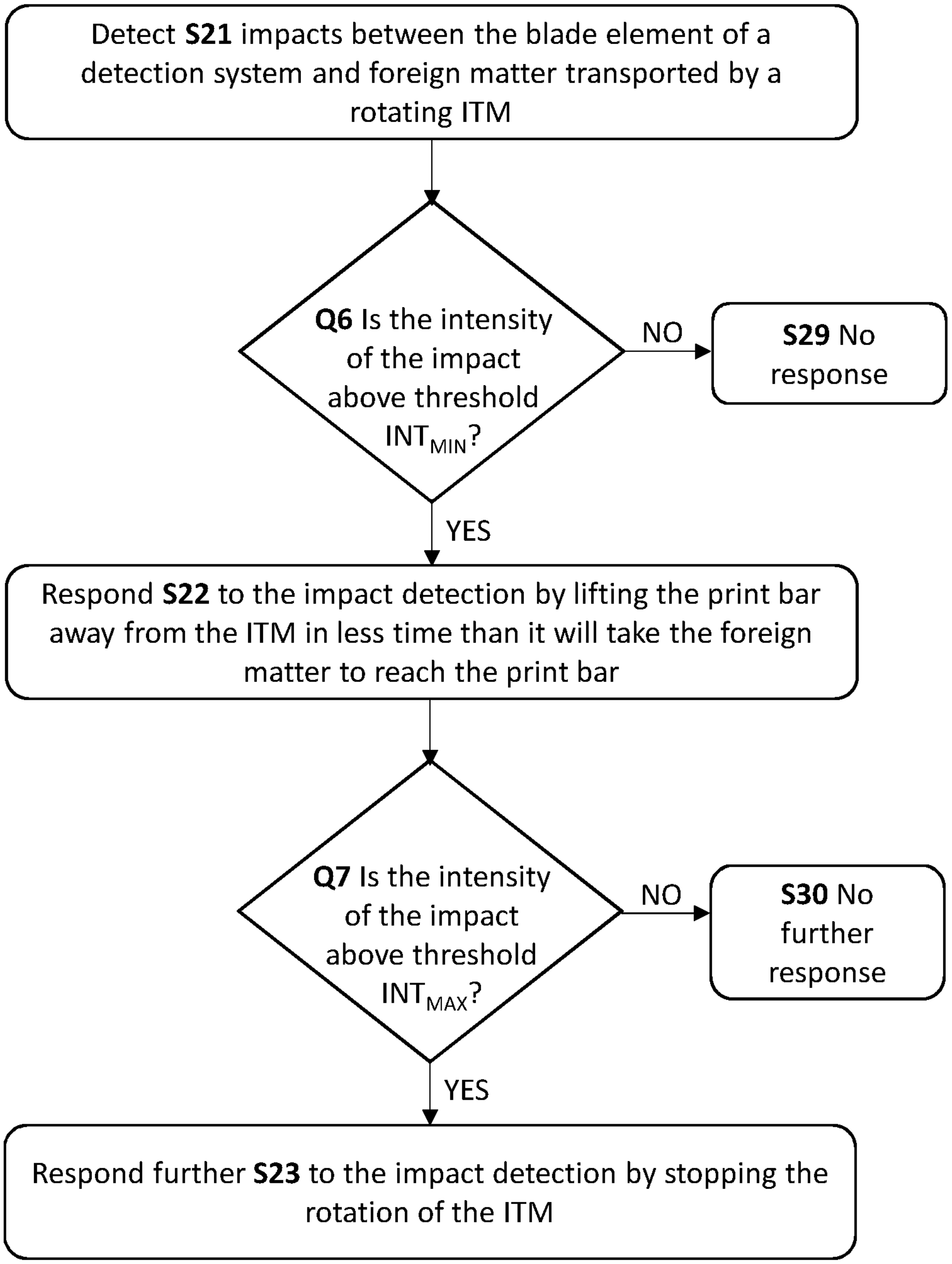
FIG. 15 is a flowchart of a method of operating a printing press that includes a detection system according to embodiments.

FIG. 15 illustrates embodiments in which a method of operating a printing system comprises:

a) Step S21 detecting impacts between the blade element of a detection system and foreign matter transported by a rotating ITM;
b) Step S22 responding to the impact detection by lifting the print bar away from the ITM to in less time than it will take the foreign matter to reach the print bar, contingent upon an affirmative resolution to designed-in pass/fail Q6 of whether the anticipated intensity of the potential collision with the print head will be above a predetermined threshold of minimum collision intensity $INT_{MIN}$ or not, whereby in the case of a negative resolution of pass/fail Q6 the method includes a non-response as in Step S29; and
c) Step S23 responding further to the impact detection by stopping the rotation of the ITM, contingent upon an affirmative resolution to decision Q7 of whether the anticipated intensity of the potential collision with the print head will be above a predetermined threshold of maximum collision intensity $INT_{MAX}$ that requires a further responsive collision-prevention action or not, whereby in the case of a negative resolution of decision Q7 the method includes a no-further-response as in Step S30.

In some embodiments, not all of the steps of the method are necessary.

In some embodiments, Step S23 of responding further to the impact detection by stopping the rotation of the ITM can be based at least in part on an operator decision as to the resolution of decision Q7.

The method of FIG. 15 can be better understood in light of the following discussion of FIGS. 16A, 16B, 16C and 16D, which illustrate a set of embodiments in which the rotational movement of blade 410 of mechanical detection system 310f is imaged by visual-range camera 191 and the images captured by camera 191 are processed by preprogrammed electronic circuitry 167. The camera 191 and electronic circuitry 167 in FIGS. 16A, 16B, 16C and 16D thus replace the limit switch 412 of FIGS. 5B, 5C and 5D, while all the other illustrated components are structurally and operationally the same.

Figure 16A:
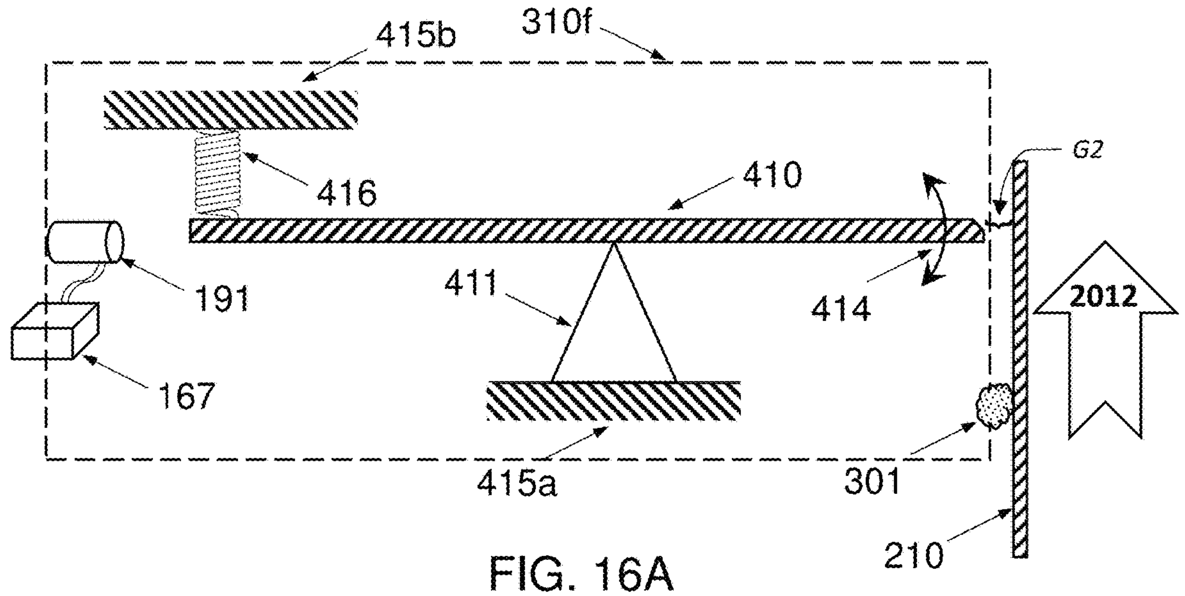
FIGS. 16A, 16B, 16C and 16D are elevation-view illustrations of components of detection systems according to embodiments.

In FIG. 16A, the mechanical detection system 310f is 'waiting' for an impact, and particle 301 of foreign matter can be seen as being transported by ITM 210 in the print direction, i.e., towards the image-forming station and its print bars and print heads (all NOT SHOWN in FIG. 16A).

Figure 16B:
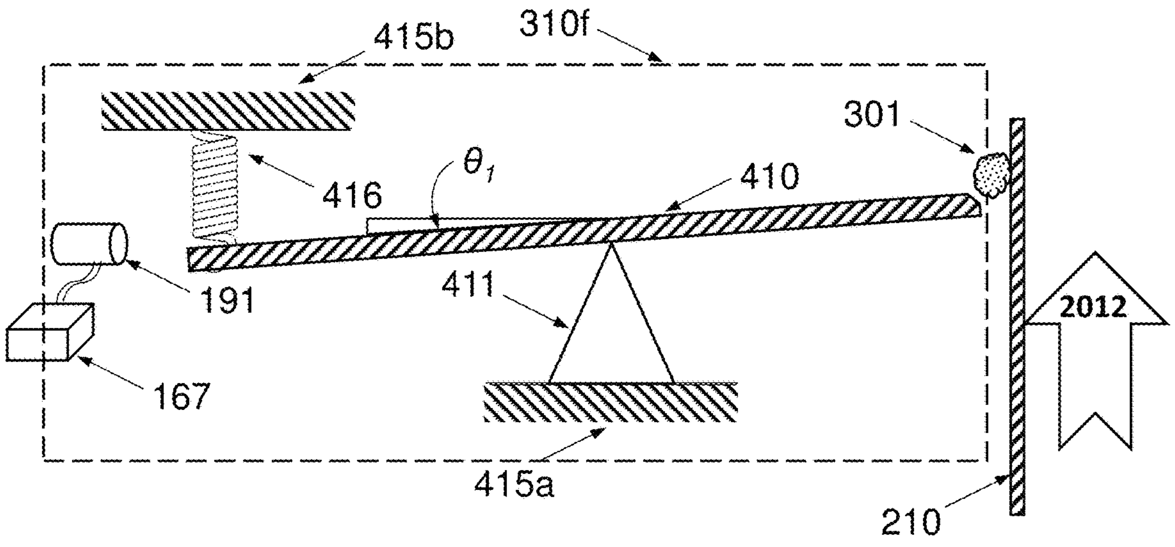

FIG. 16B shows mechanical detection system 310f at a later time than in FIG. 16A, and it can be seen that particle 301 of foreign matter has impacted the proximate edge 421 of blade 410, causing blade 410 to pivot on pivot mechanism 411, imparting a 'counter-clockwise' rotational force to blade 410 and causing a downward movement of the distal edge of blade 410 to an angle of $\theta_1$ below the horizontal. The linking means 416 is preferably configured so that an impact with intensity greater than or equal to a minimum collision intensity constant INT MIN would allow the distal edge 422 to move downwards to an extent that its detection by the camera 191 and preprogrammed electronic circuitry 167 would trigger a responsive collision-prevention action.

In FIG. 16B, the impact intensity is below $INT_{MIN}$. $INT_{MIN}$ is described above and has the same meaning and purpose here. In the example of FIG. 16B, the camera 191 captures an image of the blade 410 pivoted by an angle of $\theta_1$ from the horizontal, and electronic circuitry 167 is preprogramed with design information that a pivoting by an angle of $\theta_1$ represents an impact with an intensity below $INT_{MIN}$, i.e. Q6 of FIG. 15 is resolved in the negative and 'no-response' Step S29 is carried out rather than 'respond' Step S22.

Figure 16C:
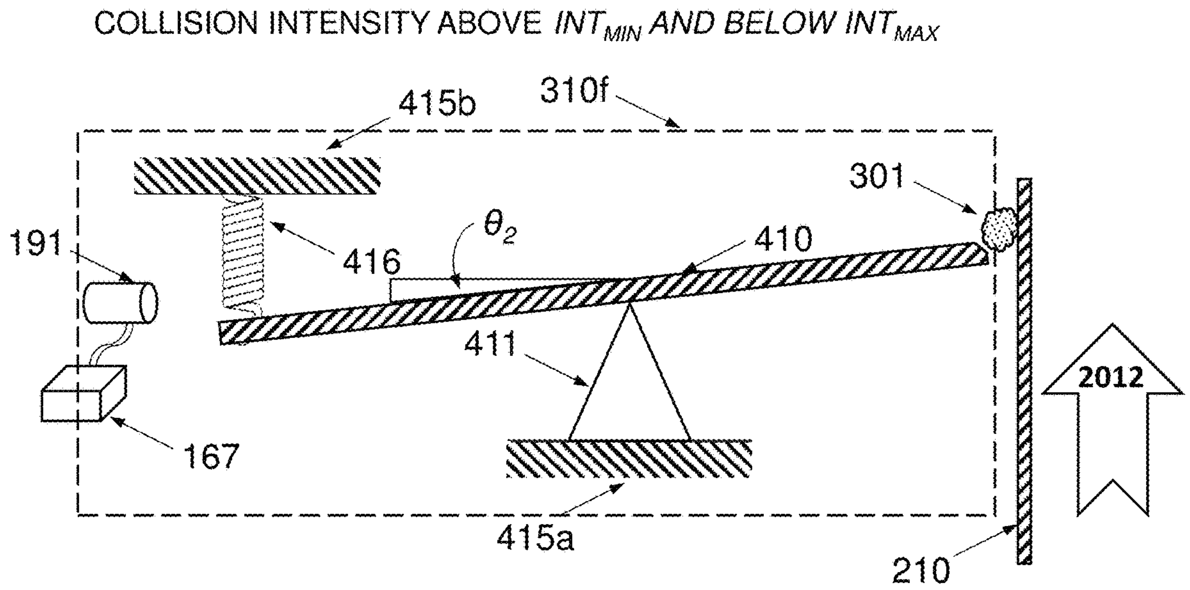

FIG. 16C shows a scenario in which the impact of particle 301 with blade 410 is of greater intensity than the impact of FIG. 16B. This is evidenced by the larger (than in FIG. 16B) angle of rotation $\theta_2$ (i.e. $\theta_2>\theta_1$) and in fact when this angle is imaged by camera 191, electronic circuitry 167 determines, for example by using a preprogrammed look-up table of angles and impact intensities, that the impact in this scenario has an intensity greater than $INT_{MIN}$ and Q6 of FIG. 15 is thus resolved in the affirmative. The look-up table can further be used to determine that the angle $\theta_2$ indicates an impact intensity smaller than $INT_{MAX}$ thus resolving Q7 of FIG. 15 in the negative and 'no-response' Step S30 is carried out rather than 'further respond' Step S23. $INT_{MAX}$ is another calculated value based on momentum of a particle at the time of collision, or the force of a collision, and indicates a collision that is likely to cause a more severe level of damage to a component of the image-forming station.

Figure 16D:
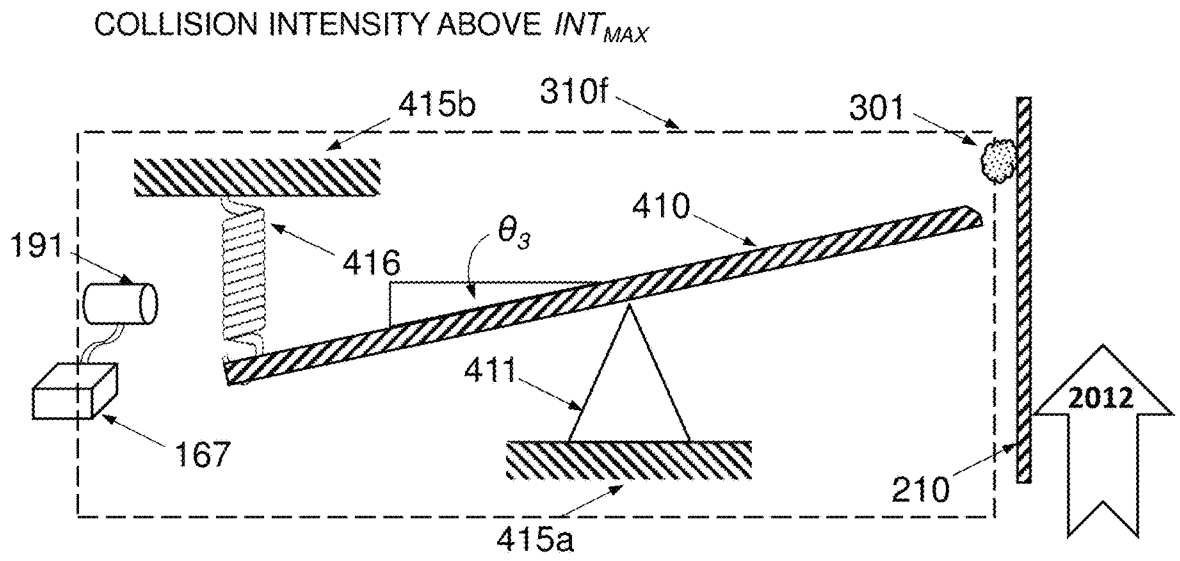

FIG. 16D shows a scenario in which the impact of particle 301 with blade 410 is of greater intensity than the impact of either FIG. 16B or FIG. 16C. This is evidenced by the even larger angle of rotation $\theta_3$ (i.e. $\theta_3>\theta_2$) and in fact when this angle is imaged by camera 191, electronic circuitry 167 determines, for example by using a preprogrammed look-up table of angles and impact intensities, that the impact in this scenario has an intensity greater than $INT_{MIN}$, thus resolving Q6 of FIG. 15 in the affirmative, and greater than $INT_{MAX}$, thus resolving Q7 of FIG. 15 in the affirmative.

The preprogrammed electronic circuitry 167 of the embodiments illustrated in FIGS. 16A, 16B, 16C and 16D can be configured to trigger a responsive collision-prevention action, for example by providing an electrical impulse to the electric actuator 229 of FIG. 14A which is configured to lift print bars 222 by raising print bar frame 225. It should be obvious that in any discussion of FIG. 14A, preprogrammed electronic circuitry 160 can be replaced by preprogrammed electronic circuitry 167 depending on the respective embodiment of detection system 301 selected. The preprogrammed electronic circuitry 167 of the embodiments illustrated in FIGS. 16A, 16B, 16C and 16D can be further configured to trigger a further responsive collision-prevention action, for example by automatically stopping the rotation of ITM 210 or displaying or sounding an alarm indicating to an operator that the rotation of the ITM 210 should be stopped.

Figure 17A:
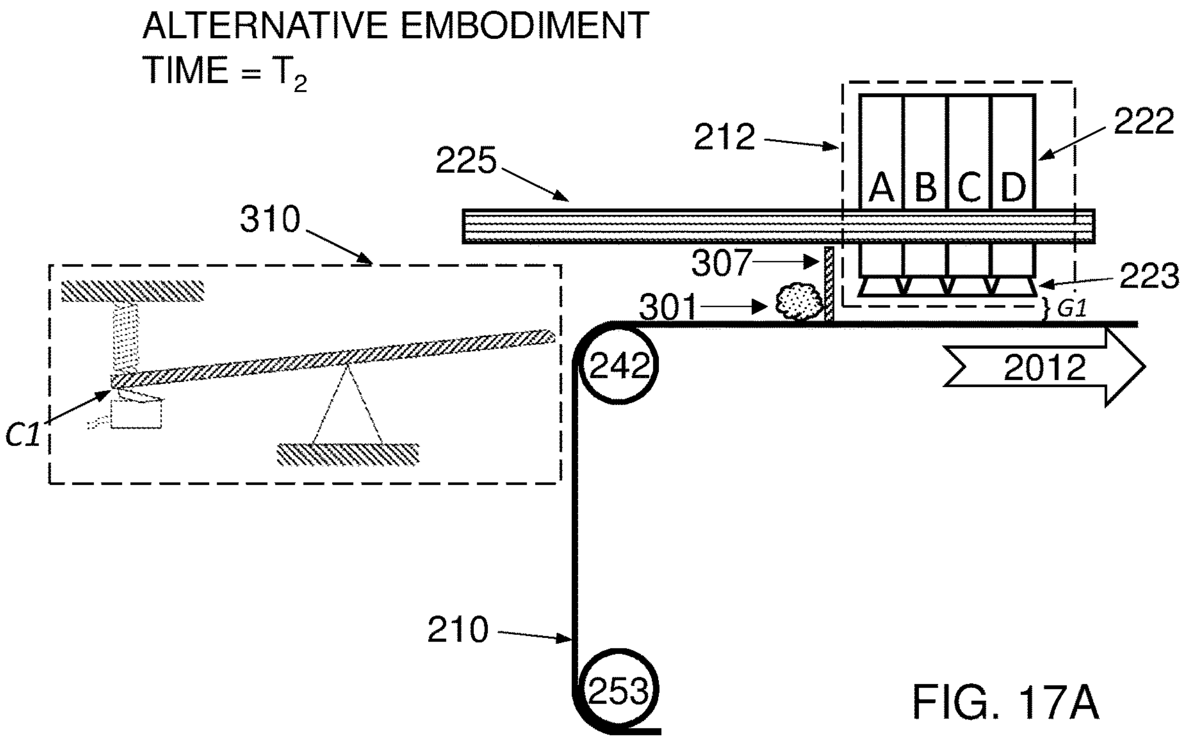
FIG. 17A is an elevation-view illustration of components of a printing system that includes a detection system according to embodiments.
Figure 17B:
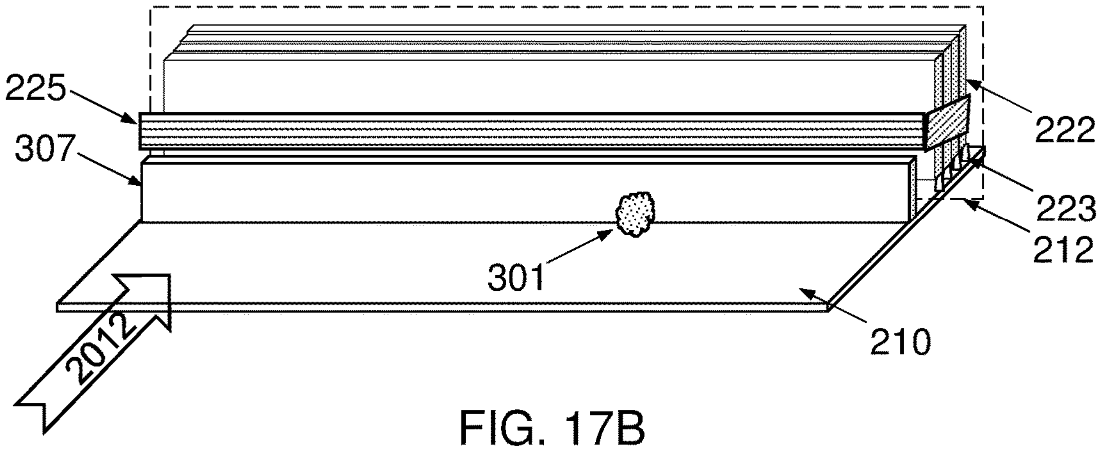
FIG. 17B is a perspective-view illustration of components of the detection system illustrated in FIG. 17A.

FIGS. 17A and 17B illustrate alternative embodiments in which a collision-preventing or collision-avoiding action in accordance with any of the embodiments disclosed herein include moving a surrogate object 307 in front of (upstream of) the print heads 223 within the response time, thereby preventing the collision of the particle 301 of foreign matter with a print head 223. Instead, the foreign matter will collide with the surrogate object. As shown in these drawings the surrogate object 307 is preferably an elongated member disposed widthwise across the surface of ITM 210, far enough away from the surface of the ITM 210 so that it does not hinder the movement of the ITM 210 and does not scrape the dried treatment formulation 2030 (shown in FIG. 2) therefrom, and close enough (preferably with a gap of less than G2) to ensure impact and eventual removal of the foreign matter. In both FIG. 17A and FIG. 17B, it can be seen that the Time is $T_2$ and the surrogate object 307 has been deployed in response to an impact of a particle 301 of foreign matter with blade 410.

Figure 18A:
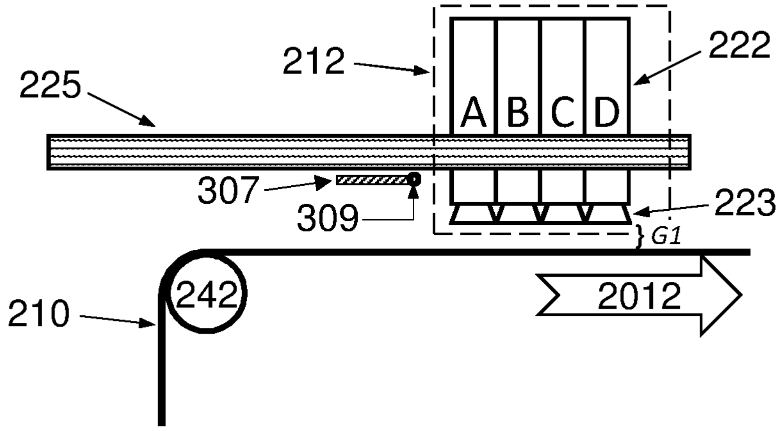
FIG. 18A is an elevation-view illustration of components of a printing system according to embodiments.

FIG. 18A illustrates an alternative embodiment in which surrogate object 307 in the form of an elongated member disposed widthwise across the surface of ITM 210 is stored (i.e., while 'waiting' for an impact detection that requires a responsive collision-prevention action) in a position above the surface of the ITM 210, having reached the storage position by pivoting with the use of a hinge 309.

Figure 18B:
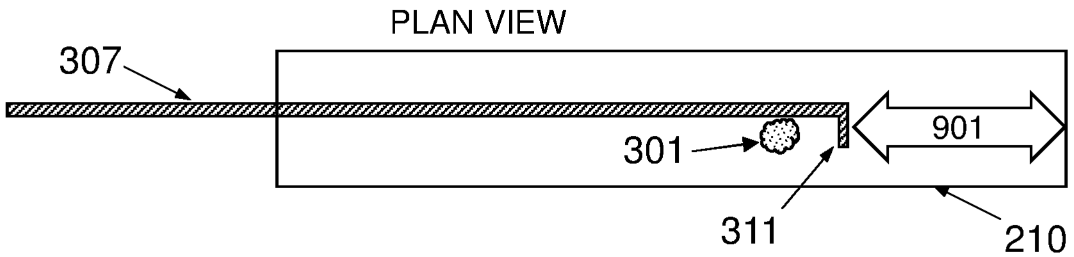
FIG. 18B is a plan-view illustration of components of a printing system according to embodiments.

FIG. 18B, a plan view of a section of the ITM 210 upstream of an image-forming station 212 as shown in FIG. 18A) illustrates other alternative embodiments in which surrogate object 307 in the form of an elongated member is disposed widthwise across the surface of ITM 210 and is caused to slide rapidly into place, by means of an electric actuator (NOT SHOWN) or other suitable mechanical means, into place across the width of the ITM 210 from a storage location off to the side of ITM 210, the surrogate object 307 having back-and-forth movement capability in the directions indicated by arrow 901. In some embodiments, surrogate object 307 includes a projection 311 configured to remove from the surface of the ITM 210 any particle 301 of foreign matter that has collided with the surrogate object, the removal taking place when the surrogate object 307 is withdrawn from being disposed widthwise across the surface of the ITM 210 after the potential collision with the print heads 223 has been averted (by the foreign matter colliding instead with the surrogate object).

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, “comprise”, “include” and “have”, and conjugates thereof, are used to indicate that the object or objects of the verb are not necessarily a complete listing of members, components, elements or parts of the subject or subjects of the verb. As used herein, the singular form “a”, “an” and “the” include plural references unless the context clearly dictates otherwise. For example, the term “a marking” or “at least one marking” may include a plurality of markings.

The invention claimed is:

1. A mechanical detection system for detecting foreign matter transported by a rotating intermediate transfer member (ITM) in a printing system that comprises (i) an image-forming station where ink images are formed on the ITM and (ii) an impression station where ink images are transferred to substrate, the mechanical detection system comprising:

a. an elongated blade;

b. a linkage means containing a spring, the linkage means linking the blade to a rigid frame; and c. at least one of a limit switch and a camera, wherein the mechanical detection system is configured to detect a collision between the foreign matter and the elongated blade in accordance with at least one of: (i) output of the limit switch and (ii) output of the camera.

2. The mechanical detection system of claim 1, disposed at a detection location facing the ITM downstream of the impression station and upstream of the image-forming station.

3. The mechanical detection system of claim 1, wherein an edge of the elongated blade proximate to the ITM is displaced therefrom with a gap, such that a particle of foreign matter larger than the gap in the direction normal to the surface of the ITM at the detection location impacts the edge of the elongated blade.

4. The mechanical detection system of claim 1, configured to detect an impact between foreign matter and the elongated blade.

5. The mechanical detection system of claim 1, wherein the detecting comprises at least one of (i) determining if the elongated blade has been rotated into contact with a limit switch and (ii) determining an angle of the blade from an image acquired by the camera.

6. The mechanical detection system of claim 1, additionally configured to send a signal to a response system to initiate a collision-prevention response to prevent a collision between the foreign matter and a component of the image-forming station.

7. The mechanical detection system of claim 6, wherein sending the signal to the response system is contingent upon an intensity of the impact between the foreign matter and the elongated blade exceeding a pre-determined threshold.

8. The mechanical detection system of claim 1, wherein said collision between the foreign matter and the elongated blade causes the elongated blade to pivot, and where the extent of pivot is related to an intensity of the collision between the elongated blade and the foreign matter.

9. A mechanical detection system for detecting foreign matter transported by a rotating intermediate transfer member (ITM) in a printing system that comprises (i) an image-forming station where ink images are formed on the ITM and (ii) an impression station where ink images are transferred to substrate, the mechanical detection system comprising:

a. a rotatable elongated blade, an edge of the elongated blade being disposed proximate to a surface of the rotating ITM so that foreign matter on the surface of the rotating ITM, if present, rotates the elongate blade;

b. a linkage means linking the blade to a rigid frame; and c. a blade orientation-detector configured to detect an orientation of the rotatable elongated blade, wherein the mechanical detection system detects the foreign matter on the surface of the rotating ITM in accordance with output of the blade orientation-detector.

10. The mechanical detection system of claim 9 wherein the blade orientation-detector comprises at least one of a limit switch and a camera.

11. The mechanical detection system of claim 9 wherein the blade orientation-detector comprises a limit switch for detecting an orientation of the blade.

12. The mechanical detection system of claim 11 wherein the mechanical detection system is configured such that impact between foreign matter on the surface of the rotating ITM and the elongated blade rotates the elongated blade into contact with the limit switch.

13. The mechanical detection system of claim 12 wherein (i) the edge of the rotatable blade proximate to the surface rotating ITM is defined as a first portion of the rotatable blade; (ii) a portion of the rotatable blade that is rotated into contact with the limit switch is defined as a second portion of the rotatable blade; and (iii) the first and second portions of the rotatable blade are disposed on opposite sides of a pivot mechanism.

14. The mechanical detection system of claim 9 wherein the blade orientation-detector comprises the camera, the camera is configured to image the elongated blade, and the blade orientation-detector further comprises image-circuitry for detecting an orientation of the elongated blade by analyzing output of the camera.

15. The mechanical detection system of claim 9 wherein the rotatable elongated blade is disposed upon pivot mechanism which is fixedly installed on the rigid frame.

16. The mechanical detection system of claim 9 wherein:

i. the ITM has the form of an endless belt defining a longitudinal direction and a lateral direction that is both perpendicular to the longitudinal direction and along the belt’s width;

ii. the elongated blade defines an elongate-direction;

iii. said elongate-direction of the elongated blade is oriented in said lateral direction of said belt.

17. The mechanical detection system of claim 9 wherein mechanical detection system comprises a blade-array of one or more said elongated blades such that: (i) a single said elongated blade of said blade-array laterally spans the endless belt; or (ii) a plurality of said elongated blades of said blade-array collectively spans the endless belt.

18. The mechanical detection system of claim 9 wherein the linking means comprises a spring.

19. The mechanical detection system of claim 9 wherein the linking means comprises at least one of a pneumatic and a hydraulic piston.

20. The mechanical detection system of claim 9 wherein the elongated blade is oriented perpendicular to a local outer surface of the intermediate transfer member (ITM).

21. The mechanical detection system of claim 9 wherein a gap G2 between the ITM and the elongated blade is less than a G1 gap between a print bar of the image forming station and the ITM.

22. The mechanical detection system of claim 9 wherein: (i) the ITM is mounted over a plurality of guide rollers including upstream and downstream guide rollers respectfully disposed upstream and downstream of the image forming station; (ii) a portion of the ITM between the upstream and downstream guide rollers is horizontal and flat; and (iii) the elongated blade faces the upstream guide roller to detect foreign matter disposed on the surface of the ITM at a location where the ITM is stretched over the upstream guide roller.

23. The mechanical detection system of claim 9 wherein the ITM has the form of an endless belt, and a distance between: (i) the location on the ITM that is adjacent to the elongated blade and (ii) the image forming station, is less than 10% of a total length of the endless belt.

24. A protection-system for protecting components of the printing system of claim 10, the protection-system comprising the mechanical detection system and a response system configured to perform at least one collision-prevention action to prevent a potential collision between foreign matter and a print bar of the image-forming station, wherein the protection-system is responsive to output of the mechanical detection system.

25. The protection-system of claim 24 wherein the response system is configured to lift the print part contingent upon a detecting of foreign matter on the ITM surface by mechanical detection system.

* * * * *